United States Patent
Burns et al.

(10) Patent No.: US 7,195,036 B2
(45) Date of Patent: Mar. 27, 2007

(54) THERMAL MICRO-VALVES FOR MICRO-INTEGRATED DEVICES

(75) Inventors: Mark A. Burns, Ann Arbor, MI (US); Rohit Pal, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 273 days.

(21) Appl. No.: 10/696,889

(22) Filed: Oct. 30, 2003

(65) Prior Publication Data

US 2004/0219732 A1    Nov. 4, 2004

Related U.S. Application Data

(60) Provisional application No. 60/423,594, filed on Nov. 4, 2002.

(51) Int. Cl.
*F15C 1/04* (2006.01)
*F16K 13/10* (2006.01)

(52) U.S. Cl. ............................ 137/828; 137/251.1

(58) Field of Classification Search ............... 137/828, 137/827, 251.1
See application file for complete search history.

(56) References Cited

U.S. PATENT DOCUMENTS

| 6,575,188 | B2* | 6/2003 | Parunak ............ 137/251.1 |
| 6,679,279 | B1* | 1/2004 | Liu et al. ............ 137/13 |
| 2002/0143437 | A1* | 10/2002 | Handique et al. ....... 700/266 |
| 2004/0007275 | A1* | 1/2004 | Liu et al. ............ 137/828 |

* cited by examiner

*Primary Examiner*—Eric Keasel
*Assistant Examiner*—Craig Schneider
(74) *Attorney, Agent, or Firm*—Medlen & Carroll, LLP

(57) ABSTRACT

The movement and mixing of microdroplets through microchannels is described employing silicon-based microscale devices, comprising microdroplet transport channels, reaction regions, electrophoresis modules, and radiation detectors. The discrete droplets are differentially heated and propelled through etched channels. Electronic components are fabricated on the same substrate material, allowing sensors and controlling circuitry to be incorporated in the same device.

11 Claims, 31 Drawing Sheets

(A) (B) (C)

THERMAL MICRO-VALVES FOR MICRO-INTEGRATED DEVICES

This is a conversion of the Provisional Application No. 60/423,594 filed on Nov. 4, 2002.

This work was funded in part by NIH grant number R01-HG01406. The government may have certain rights in the invention.

FIELD OF THE INVENTION

The present invention relates to microfabrication of microscale devices and reactions in microscale devices, and in particular, movement of biological samples in microdroplets through microchannels to initiate biological reactions. More particularly, the present invention relates to phase change latched valves for micro-integrated devices.

BACKGROUND

Current bioassay technologies are adequate for the detailed analysis of samples that range in number from hundreds to thousands per year. Projects requiring on the order of millions of assays, however, are beyond the capabilities of today's laboratories because of the current inefficiencies in (i) liquid handling of reagent and DNA template solutions, (ii) measurement of solution volumes, (iii) mixing of reagent and template, (iv) controlled thermal reaction of the mixed solutions, (v) sample loading onto an electrophoresis gel, and (vi) DNA product detection on size-separating gels. What is needed is methodology that allows for a high-volume of biological reactions without these existing inefficiencies.

Microfabricated devices are finding application in a wide range of new areas. As the functions performed by a device increases the design becomes more complicated. It then becomes essential to realize complex fluidic manipulation on the microfabricated chip device. Central to this problem, is the need to develop a microfluidic valve which is not only simple to integrate but also has high reliability as failure of one valve would lead to the failure of the entire device. This is one of the main problems hindering the commercialization of microfluidic devices. A lot of work is being done in both academic institutions and industry to solve this problem. However, most of the valves consist of a movable diaphragm, have intricate principles of actuation and elaborate fabrication procedures. This makes them difficult to integrate into a microfabricated device and makes them much more susceptible to failures such as leakage and breakdown. Therefore, what is needed is a reliable, easy to integrate and, preferably, inexpensive valve for use in conjunction with microfabricated microfluidic devices.

SUMMARY OF THE INVENTION

The present invention relates to an improvement in the design, production and use of valves in microscale devices and, in particular, the movement and control of liquids through microscale devices utilizing the improved valving devices and methodologies of the present invention.

The present invention relates to microfabrication of phase change latched valves for microscale devices and reactions in microscale devices, and in particular, movement and control of biological samples in microdroplets through microchannels via the phase change latched valves of the present invention. In one embodiment, the present invention contemplates microscale devices, comprising microdroplet transport channels, reaction regions (e.g. chambers), electrophoresis modules, radiation detectors and phase change latch valves. In a preferred embodiment, these elements are microfabricated from silicon and glass substrates. In another embodiment, the various components are linked (i.e., in liquid communication) using a surface-tension-gradient mechanism in which discrete droplets are differentially heated and propelled through etched channels. Electronic components are fabricated on the same substrate material, allowing sensors and controlling circuitry to be incorporated in the same device. Since all of the components are made using conventional photolithographic techniques, multi-component devices can be readily assembled into complex, integrated systems.

In one embodiment, the present invention contemplates phase change latched valves. Although the present invention is not limited to any particular theory, the valves of the present invention operate by inducing a phase change in a material whereupon the material may be liquified in order to move it to a predetermined location where it can act to block the flow of substance through a channel. Upon reaching the predetermined location the material is solidified and, thus, blocks the flow of liquids, gases or other substances through the channel. When desired, the material can be reliquified and drawn back out of the channel to allow the flow of material through the channel.

In one embodiment of the present invention, the particular composition of the material used as the valve may be any material that can convert from a liquid to solid or semisolid form as a result of a change in temperature. In another embodiment, the valving material is inert with respect to the substances being conveyed through the microdevice. In the case of biological assays, said substances may be saline solutions, blood, cell extracts, solutions comprising proteins, minerals (e.g., minerals typically found in biological organisms) or other molecules and compositions found in biological systems, solutions of varying pH typically in the range of pH 1 to pH 13, more typically in the range of pH 4 to pH 10 and even more typically in the range of pH 6 to pH 8, solutions of varying salinity and solutions of varying temperature providing that the temperature of the substrate solution is less than the melting point of the valving material.

In one embodiment of the present invention, the valving material comprises wax (e.g., Logitech wax, paraffin wax, M1595 synthetic wax, C105 wax, APS wax or a mixture thereof). In another embodiment, any wax can be chosen that matches the values of temperature required for other operations on the chip and the melting point of the wax. In yet another embodiment of the reaction, the valving material comprises any material that is relatively inert to the substrate moving through the microdevice channel, and has a melting point that allows for rapid liquification and solidification within the microdevice. For example, in addition to the waxes listed above, metal alloys (e.g., solder) and plastics (any plastic known in the art that has the required melting, cooling and biocompatibility properties) are contemplated for use as valving materials.

It is contemplated in one embodiment of the present invention that the fluid wax is move by positive and negative air pressure. Although the present invention is not limited to any particular theory, in one embodiment, the wax (located, for example, in a side channel) is heated to convert it from a solid or semisolid state to a liquid state. Since the volume of wax used is small and the heating device is located in the microfabricated device, the wax can be heated to melting point quickly. Upon melting, the wax is pushed forward by positive air pressure into the channel where it cools, for example, by heat displacement caused by the cooler temperature of the device in the area of the channel and by the cooler temperature of the fluid moving through the channel. Upon cooling, the wax blocks the channel and prevents fluid flow through the channel. To open the valve (i.e., remove the wax from the channel) the wax is heated allowing it to liquify and it is then drawn back into the side channel by negative air pressure.

In another embodiment, the present invention contemplates that the fluid wax is moved without positive or negative air pressure. For example, in one embodiment, the fluid wax is moved by temperature differences generated by the heaters of the present invention. Although the present invention is not limited to any particular theory, it is contemplated that rapid changes in heat in the confined spaces of the channels of the present invention creates changes in air density and such changes in air density is capable of pushing or drawing the fluid wax into or out of the valve area.

It is not intended that the phase change latch valves of the present invention be limited by the nature of the reactions carried out in the microscale device. Reactions include, but are not limited to, chemical and biological reactions. Biological reactions include, but are not limited to sequencing, restriction enzyme digests, RFLP, nucleic acid amplification, and gel electrophoresis. It is also not intended that the invention be limited by the particular purpose for carrying out the biological reactions. In one medical diagnostic application, it may be desirable to differentiate between a heterozygotic and homozygotic target and, in the latter case, specifying which homozygote is present. Where a given genetic locus might code for allele A or allele a, the assay allows for the differentiation of an AA from an Aa from an aa pair of alleles. In another medical diagnostic application, it may be desirable to simply detect the presence or absence of specific allelic variants of pathogens in a clinical sample. For example, different species or subspecies of bacteria may have different susceptibilities to antibiotics; rapid identification of the specific species or subspecies present aids diagnosis and allows initiation of appropriate treatment.

Additionally, and in conjunction with the methods and devices of the present invention, the present invention contemplates a method for regulating the movement of microdroplets, comprising: (a) providing a liquid microdroplet disposed within a microdroplet transport channel etched in silicon, said channel in liquid communication with a reaction region via said transport channel and separated from a microdroplet flow-directing means by a liquid barrier; and (b) blocking the movement of the microdroplet by placing within the channel a substance that, upon entering the channel, becomes solid or semisolid. It is not intended that the present invention be limited by the particular nature of the microdroplet flow-regulating means. In one embodiment, it comprises a fluid wax that is moved by positive air pressure to the channel blocking area. In another embodiment, the wax is made fluid by one or more heating elements (e.g., aluminum heating elements) arrayed along the wax storage channel. In yet another embodiment, the wax is cooled upon entering the transport channel by convection of the heat of the wax and by the cooling effect of the cooler micro-droplets.

It has been found empirically that the methods and devices of the present invention, including the phase change latch valves, can be enhanced when, prior to the conveying described above, the transport channel (or channels) is treated with a hydrophilicity-enhancing compound. It is not intended that the invention be limited by exactly when the treatment takes place. Indeed, there is some flexibility because of the long-life characteristics of some enhancing compounds.

Again, it has been found empirically that there is a need for a liquid barrier between the liquid in the channels and the electronics of the silicon chip. A preferred barrier comprises a first silicon oxide layer, a silicon nitride layer, and a second silicon oxide layer.

Additionally, and in conjunction with the methods and devices of the present invention, the present invention further contemplates a method for regulating the merging microdroplets comprising: (a) providing first and second liquid microdroplets, a liquid microdroplet delivering means, and a device, said device comprising: i) a housing comprised of silicon, ii) first and second microdroplet transport channels etched in said silicon and connecting to form a third transport channel containing a reaction region, iii) a microdroplet receiving means in liquid communication with said reaction region via said transport channels, and iv) microdroplet flow-controlling means such as, for example, one or more phase change latch valves arrayed along said first, second and third transport channels; (b) delivering said first liquid microdroplet via said microdroplet delivering means to said first transport channel; (c) delivering said second liquid microdroplet via said microdroplet delivering means to said second transport channel; and (d) conveying said microdroplets in said transport channels to said reaction region in said third transport channel via said microdroplet flow-controlling means, thereby regulating the merging of said first and second microdroplets to create a merged microdroplet.

In one embodiment, said first microdroplet comprises nucleic acid and said second microdroplet comprises a nuclease capable of acting on said nucleic acid. In this embodiment, it is desirable to regulate the mixing of the to be merged microdroplets. This can be achieved a number of ways. In one embodiment for the regulation of mixing, after the conveying of step (d), the flow of one or both of the microdroplets is stopped by, for example, the phase change latch valves of the present invention. It is not intended that the present invention be limited by the nature or number of openings or closings of the valves.

The present invention contemplates a variety of silicon-based, microdroplet transport channel-containing devices comprising the phase change latch valves of the present invention. In one embodiment, the device comprises: i) a housing comprised of silicon, ii) a microdroplet transport channel etched in said silicon, iii) a microdroplet receiving means in liquid communication with a reaction region via said transport channels, iv) one or more phase change latch valves and, v) a liquid barrier disposed between said transport channels and a microdroplet flow-directing means. In one embodiment, the device is assembled in two parts. First, the channels are etched in any number of configurations. Second, this piece is bonded with a silicon-based chip containing the electronics. This allows for both customization (in the first piece) and standardization (in the second piece).

The present invention also contemplates devices and methods for the sealing of channels with meltable material, i.e., a phase change latch valve. In one embodiment, the present invention contemplates a method comprising: a) providing a device having a meltable material disposed within a side channel and associated with a heating element; b) heating said meltable material with said heating element such that said meltable material at least partially liquifies.

The method may further comprise c) moving the liquified meltable material to the reaction channel with, for example, air pressure; and d) allowing said liquified meltable material to cool. While the present invention is not limited by the size of the channel, in one embodiment said device further comprises a microdroplet channel disposed in said device, said meltable material is disposed within said microdroplet channel (i.e., the side channel or secondary channel).

The present invention also contemplates a method for restricting fluid flow in a channel, comprising: a) providing: i) a main channel connected to a side channel and disposed within a substrate, ii) meltable material disposed within said side channel and associated with a heating element, and iii) a movement means connected to said side channel such that application of said movement means induces said meltable material to flow from said side channel into said main channel; b) heating said meltable material such that said meltable material at least partially liquifies and, c) applying said movement means such that said liquified meltable material flows from said side channel into said main channel. While the present invention is not limited by the movement means, in one embodiment the movement means is forced air (i.e., positive air pressure). In one embodiment the method further comprises d) allowing said meltable material to cool. While the present invention is not limited by the size of the channel, in one embodiment, the main channel and the side channel are microdroplet channels. In another embodiment, the present invention contemplates the opening of the valve by a) heating said meltable material such that said meltable material at least partially liquifies and, c) applying said movement means such that said liquified meltable material flows from said main channel to said side channel. While the present invention is not limited by the movement means, in one embodiment, the movement means is forced air (i.e., negative air pressure).

While the present invention is not limited by the nature of the material used to make the microdevice, in one embodiment the material comprises silicon or glass. Likewise, the present invention is not limited by the composition of the meltable material. In one embodiment, the meltable material comprises solder. In a preferred embodiment, the solder comprises 40:60 Sn:Pb. In other embodiments, the meltable material is selected from a group consisting of plastic, polymer and wax. Likewise, the present invention is not limited by the placement of the meltable material in the device. In another embodiment, the meltable material is placed adjacent to a channel, while in another embodiment it is placed near the junction of more than one channel.

In one embodiment, the present invention contemplates a device comprising a meltable material disposed within a substrate and associated with one or more heating elements. In another embodiment, the present invention contemplates that the device comprises further a primary channel and a secondary channel within said substrate, said meltable material disposed within said secondary channel. In yet another embodiment, the present invention contemplates that the substrate is selected from the group consisting of glass and silicon. In still yet another embodiment, the present invention contemplates that the meltable material is selected from a group consisting of solder, wax, plastic, polymer and electrorheological fluid. In still yet another embodiment, the present invention contemplates that the wax is selected from paraffin, Logitech wax, M1595 synthetic wax C105 wax, APS wax and mixtures thereof. In still yet another embodiment, the present invention contemplates that the device comprises a means for providing movement of the meltable material. In still yet another embodiment, the present invention contemplates that the means for movement of said meltable material is provided by positive pressure, negative pressure or both, to said secondary channel. In still yet another embodiment, the present invention contemplates that the device is part of an array.

In one embodiment of the present invention a method is contemplated comprising: a) a device comprising a meltable material disposed within a substrate, said meltable material associated with a heating element; and b) heating said meltable material with said heating element such that said meltable material at least partially liquifies and such that said substrate is not damaged. In another embodiment of the method of the present invention it is contemplated that the method further comprises c) allowing said meltable material to cool. In yet another embodiment of the present invention it is contemplated that the substrate further comprises a primary channel and a secondary channel within said substrate, said meltable material disposed within said secondary channel. In still yet another embodiment of the method of the present invention it is contemplated that the substrate is selected from the group consisting of silicon and glass. In still yet another embodiment of the method of the present invention it is contemplated that the meltable material is selected from a group consisting of solder, wax, plastic, polymer and electrorheological fluid. In still yet another embodiment of the method of the present invention it is contemplated that the wax is selected from paraffin, Logitech wax, M1595 synthetic wax, C105 wax, APS wax and mixtures thereof. In still yet another embodiment of the method of the present invention it is contemplated that a means for providing movement of the meltable material is provided. In still yet another embodiment of the method of the present invention it is contemplated that the means for movement of said meltable material is provided by positive pressure, negative pressure or both, to said secondary channel. In still yet another embodiment of the method of the present invention it is contemplated that the meltable material is allowed to cool.

In one embodiment of the method of the present invention a method is contemplated for fluid flow in a channel, comprising: a) providing: i) a main channel connected to a secondary channel and disposed within a substrate, ii) meltable material disposed within said secondary channel and associated with a heating element, and iii) a movement means connected to said side channel such that application of said movement means induces said meltable material to flow from said side channel into said main channel; b) heating said meltable material such that said meltable material at least partially liquifies; and c) applying said movement means such that said liquified meltable material flows from said side channel into said main channel. In another embodiment of the method of the present invention it is contemplated that the movement means is forced air. In yet another embodiment of the method of the present invention it is contemplated that the method further comprises d) allowing said meltable material to cool. In still yet another embodiment of the method of the present invention it is contemplated that the primary channel and said secondary channel are microdroplet channels. In still yet another embodiment of the method of the present invention it is contemplated that the substrate is selected from the group consisting of silicon and glass. In still yet another embodiment of the method of the present invention it is contemplated that the meltable material is selected from a group consisting of solder, wax, plastic, polymer and electrorheological fluids. In still yet another embodiment of the method of the present invention it is contemplated that the wax is selected from paraffin, Logitech wax, M1595 synthetic wax, C105 wax, APS wax and mixtures thereof.

Additional embodiments of the present invention include a vacuum/pressure source wherein the source is on the chip or off the chip. Additionally, the vacuum/pressure source can be associated with all of the valve connections on a single or multiple chips. Further embodiments include that the motion of the wax or other valve material is reproducibly controlled by a heat gradient or by pressure and vacuum. It is further contemplated that the actuation time of the valves of the present invention can be actuated in less that 1 second and preferably under 500 ms.

In one embodiment of the present invention the voltage and temperature is optimized for the opening and closing of the valve. In another embodiment, the valves of the present invention and associated controlling mechanisms are optimized for the use of minimum power, robust operation and consistent control. Further embodiments include that the valves and valving systems are coupled to detectors for optimum control. Such detectors may be temperature and pressure detectors.

In yet another embodiment of the present invention, the valves of the present invention are arranged in arrays.

In yet another embodiment of the present invention, the valve shall comprise heater elements to melt and, in some embodiments, move the meltable material. The valve is not limited by the number of heater elements. The number of heater elements shall be determined by the number necessary to make the meltable material at least semi-liquid for movement to the junction of the first and second microchannels. In one embodiment, the valve shall comprise three heater elements. In another embodiment, the second heater element shall be optional.

In another embodiment, the present invention contemplates a method, comprising: a) providing meltable material and a device, the device comprising: an inlet port in fluidic communication with a first microchannel, the first microchannel having a middle section and an end section, the end section intersecting a second microchannel at a junction, wherein a first heater element is associated with the inlet port, a second heater element is associated with the middle section of first microchannel, and a third heater element is associated with the second microchannel at the junction, and wherein the inlet port is linked to a gas source; b) introducing the meltable material at the inlet port; c) activating the first heater element under conditions such that the meltable material at least partially melts to create a melted material; d) applying pressure with the gas source to the melted material; and e) activating the second heater under conditions such that the melted material remains melted, moves to the junction and at least partially solidifies, thereby creating a plug at the junction blocking the second microchannel. In another embodiment, the present invention further contemplates that steps (b) and (c) are performed in any order. In yet another embodiment, the present invention further contemplates that steps (b) and (c) are performed simultaneously (or substantially simultaneously, i.e., within 2 seconds of each other). In still yet another embodiment, the present invention further contemplates that steps (d) and (e) are performed in any order. In still yet another embodiment, the present invention further contemplates that steps (d) and (e) are performed simultaneously. In still yet another embodiment, the present invention further contemplates that steps (c), (d) and (e) are performed simultaneously. In still yet another embodiment, the present invention further contemplates that the gas source is an air source. In still yet another embodiment, the present invention further contemplates that the junction is configured as a "T" junction. In still yet another embodiment, the present invention further contemplates that the junction is configured as a "Y" junction. In still yet another embodiment, the present invention further contemplates that the meltable material is selected from a group consisting of solder, plastic, polymer, electrorheological fluid and wax. In still yet another embodiment, the present invention further contemplates that the melted material moves to the junction in step (e), the melted material is allowed to cool. In still yet another embodiment, the present invention further contemplates that the inlet port is further linked to a vacuum. In still yet another embodiment, the present invention further contemplates that the method of further comprises: (f) activating the third heater under conditions such that plug at the junction at least partially melts so as to create an at least partially melted plug; and (g) applying a vacuum through the inlet port under conditions such that the at least partially melted plug is retracted from the junction, thereby unblocking the second microchannel. In still yet another embodiment, the present invention further contemplates that the method further comprising activating the second heater at approximately the same step (f) is performed.

In one embodiment, the present invention contemplates that a method, comprising: a) providing meltable material and a device, the device comprising: an inlet port in fluidic communication with a first microchannel, the first microchannel disposed in a substrate and having a middle section and an end section, the end section intersecting a second microchannel at a junction, the second microchannel disposed in a substrate, wherein a first heater element is associated with the inlet port, a second heater element is associated with the middle section of first microchannel, and a third heater element is associated with the second microchannel at the junction, and wherein the inlet port is linked to a gas source; b) introducing the meltable material at the inlet port; c) activating the first heater element under conditions such that the meltable material at least partially melts to created melted material; d) applying pressure with the gas source to the melted material; and e) activating the second heater under conditions such that the melted material remains melted, moves to the junction and at least partially solidifies, thereby creating a plug at the junction blocking the second microchannel. In yet another embodiment, the present invention further contemplates that the steps (b) and (c) are performed in any order. In still yet another embodiment, the present invention further contemplates that the steps (b) and (c) are performed simultaneously (or substantially simultaneously, i.e., within 2 seconds of each other). In still yet another embodiment, the present invention further contemplates that the steps (d) and (e) are performed in any order. In still yet another embodiment, the present invention further contemplates that the steps (d) and (e) are performed simultaneously. In still yet another embodiment, the present invention further contemplates that the steps (c), (d) and (e) are performed simultaneously. In still yet another embodiment, the present invention further contemplates that the gas source is an air source. In still yet another embodiment, the present invention further contemplates that the junction is configured as a "T" junction. In still yet another embodiment, the present invention further contemplates that the junction is configured as a "Y" junction. In still yet another embodiment, the present invention further contemplates that the meltable material is selected from a group consisting of solder, plastic, polymer, electrorheological fluid and wax. In still yet another embodiment, the present invention further contemplates that after the melted material moves to the junction in step (e), the melted material is allowed to cool. In still yet another embodiment, the present invention further contemplates that the inlet port is further linked to a vacuum. In still yet another embodiment, the present invention contemplates that the method further comprises: (f) activating the third heater under conditions such that plug at the junction at least partially melts so as to create an at least partially melted plug; and (g) applying a vacuum through the inlet port under conditions such that the at least partially melted plug is retracted from the junction, thereby unblocking the second microchannel. In still yet another embodiment, the present invention further contemplates that the method further comprises activating the second heater at approximately the same step (f) is performed. In still yet another embodiment, the present invention further contemplates that the substrate is selected from the group consisting of glass and silicon.

In one another embodiment, the present invention further contemplates a device, comprising: an inlet port in fluidic communication with a first microchannel, the first microchannel having a middle section and an end section, the end section intersecting a second microchannel at a junction, wherein a first heater element is associated with the inlet port, a second heater element is associated with the middle section of first microchannel, and a third heater element is associated with the second microchannel at the junction, and wherein the inlet port is linked to an air source and a vacuum source

Definitions

The following definitions are provided for the terms used herein:

"Biological reactions" means reactions involving biomolecules such as enzymes (e.g., polymerases, nucleases, etc.) and nucleic acids (both RNA and DNA). Biological samples are those containing biomolecules, such proteins, lipids, nucleic acids. The sample may be from a microorganism (e.g., bacterial culture) or from an animal, including humans (e.g. blood, urine, etc.). Alternatively, the sample may have been subject to purification (e.g. extraction) or other treatment. Biological reactions require some degree of biocompatability with the device. That is to say, the reactions ideally should not be substantially inhibited by the characteristics or nature of the device components.

"Biocompatability" shall be defined as any substance, synthetic or natural, that can be used as a system or part of a system that comprises biological materials (e.g. proteins, nucleic acids, lipids, carbohydrates, etc.) with no adverse affect or minimal adverse affect on the biological materials.

"Chemical reactions" means reactions involving chemical reactants, such as inorganic compounds.

"Channels" are pathways through a medium (e.g., silicon) that allow for movement of liquids and gasses. Channels thus can connect other components, i.e., keep components "in liquid communication." "Microdroplet transport channels" are channels configured (in microns) so as to accommodate "microdroplets." While it is not intended that the present invention be limited by precise dimensions of the channels or precise volumes for microdroplets, illustrative ranges for channels and microdroplets are as follows: the channels can be between 0.35 and 50 µm in depth (preferably 20 µm) and between 50 and 1000 µm in width (preferably 500 µm), and the volume of the microdroplets can range (calculated from their lengths) between approximately one (1) and (100) nanoliters (more typically between ten and fifty). Although it is not intended that the present invention be limited by the materials conveyed by the channels, "Primary channels" or main channels are, usually, channels that convey biological substances (e.g., protein, nucleic acids, etc.) and "secondary channels" or "side channels" are usually channels that convey non-biological substances (e.g., plastics, waxes, metal alloys, etc.).

"Conveying" means "causing to be moved through" as in the case where a microdroplet is conveyed through a transport channel to a particular point, such as a reaction region. Conveying can be accomplished via flow-directing means.

"Flow-directing means" is any means by which movement of a microdroplet in a particular direction is achieved. A preferred directing means employs a surface-tension-gradient mechanism in which discrete droplets are differentially heated and propelled through etched channels.

"Hydrophilicity-enhancing compounds" are those compounds or preparations that enhance the hydrophilicity of a component, such as the hydrophilicity of a transport channel. The definition is functional, rather than structural. For example, Rain-X™ anti-fog is a commercially available reagent containing glycols and siloxanes in ethyl alcohol. However, the fact that it renders a glass or silicon surface more hydrophilic is more important than the reagent's particular formula.

"Initiating a reaction" means causing a reaction to take place. Reactions can be initiated by any means (e.g., heat, wavelengths of light, addition of a catalyst, etc.)

"Liquid barrier" or "moisture barrier" is any structure or treatment process on existing structures that prevents short circuits and/or damage to electronic elements (e.g., prevents the destruction of the aluminum heating elements). In one embodiment of the present invention, the liquid barrier comprises a first silicon oxide layer, a silicon nitride layer, and a second silicon oxide layer.

"Merging" is distinct from "mixing." When a first and second microdroplet is merged to create a merged microdroplet, the liquid may or may not be mixed. Moreover, the degree of mixing in a merged microdroplet can be enhanced by a variety of techniques contemplated by the present invention, including but not limited to reversing the flow direction of the merged microdroplet.

"Nucleic Acid Amplification" involves increasing the concentration of nucleic acid, and in particular, the concentration of a particular piece of nucleic acid. A preferred technique is known as the "polymerase chain reaction." Mullis et al., U.S. Pat. Nos. 4,683,195 and 4,683,202, hereby incorporated by reference, describe a method for increasing the concentration of a segment of target sequence in a mixture of genomic DNA without cloning or purification. This process for amplifying the target sequence consists of introducing a molar excess of two oligonucleotide primers to the DNA mixture containing the desired target sequence. The two primers are complementary to their respective strands of the double-stranded sequence. The mixture is denatured and then allowed to hybridize. Following hybridization, the primers are extended with polymerase so as to form complementary strands. The steps of denaturation, hybridization, and polymerase extension can be repeated as often as needed to obtain a relatively high concentration of a segment of the desired target sequence. The length of the segment of the desired target sequence is determined by the relative positions of the primers with respect to each other, and therefore, this length is a controllable parameter. By virtue of the repeating aspect of the process, the method is referred to by the inventors as the "Polymerase Chain Reaction" (hereinafter PCR). Because the desired segment of the target sequence become the dominant sequences (in terms of concentration) in the mixture, they are said to be "PCR-amplified."

"Substrate" as used herein refers to a material capable of containing channels and microdroplet transport channels. Examples include, but are not limited to, silicon and glass.

"Meltable material," "phase change material" or "liquifiable element" as used herein refers to a material that is at least semi-solid (and preferably completely solid) at ambient temperature, will liquify when heated to temperatures above ambient temperature, and will at least partially resolidify when cooled. Preferably, meltable material at least partially liquifies at a temperature such that the substrate is undamaged. That is to say, at the temperature the meltable material liquifies, the substrate and other materials in the substrate do not liquify and does not change its properties. By "changing properties" it is meant that the substrate, metal or other material maintains it structural integrity, does not change its conductivity and does not liquify. Thus, the characteristic of being meltable is not necessarily associated with a particular melting point. Examples include, but are not limited to, solder, wax, polymer, electrorheological fluids, swellable colloidal solutions and plastic. "Melted," "molten" and any melted or partially melted state of a meltable material, phase change material or liquifiable element shall be defined as a state of a substance that has been liquified or made semi-liquid by heat or other energy source but has not cooled to a non-liquid state. Additionally, "meltable material," "phase change material" and "liquifiable element" shall all be defined to be melted when in a semi-liquid, semi-solid, partially solidified, partially melted or liquid state. A "partially melted plug" shall be defined as any meltable material that has been solidified or partially solidified and is then being made liquid, semi-liquid or partially liquid. "Said melted material moves" and similar phrases shall be defined as the transposition of the above defined meltable materials from one place to another place in a microchannel. It is not necessary that the entire mass of meltable material moves providing at least a portion of the meltable material moves at least 5 microns.

"Phase change valve," "Phase change latch valve," "molten valve" and "liquifiable valve" are synonymous in the context of the present application and invention and shall be defined as any valve of the present invention that comprises a liquifiable, phase change or meltable material.

"Electrorheological fluid" shall be defined as suspensions of extremely fine particles (up to 50 microns) in non-conducting fluids. The apparent viscosity of these fluids change reversibly in response to an electric field. For instance, a typical ER fluid can go from the consistency of a liquid to that of a gel, and back, with response times on the order of milliseconds. The change in viscosity is proportional to the applied potential.

"Plastics" shall be defined as substances made of plastic that respond in the present invention as defined under "meltable material."

"Polymers" shall be defined as a mixture of two or more substances made of material that respond (either alone or in combination) in the present invention as defined under "meltable material."

"Solder" as used herein refers to a metal or alloy that is a meltable material. Preferably, the solder is a lower temperature solder, such as set forth in U.S. Pat. No. 4,967,950, herein incorporated by reference. "Lower temperature solder" means a eutectic alloy. While the present invention is not limited to a specific solder, one preferred solder composition for the paste is a 63:37 eutectic alloy of tin:lead.

Another compatible solder is a 90% metal composition having a 63:35:2 eutectic alloy of tin:lead:silver. Other desired solder compositions such as eutectic Pb:Sn, Pb:In, Pb:In:Sn etc.

"Hysteresis" shall be defined as a change of the effect when the forces acting upon a body are changed (as if from viscosity or internal friction). For example, in the present invention, hysteresis may include friction, cooling, heating, laminar flow, etc.

"Heating element" and "heater element" as used herein refers to an element that is capable of at least partially liquify a meltable material. A meltable material is "associated with" a heating element when it is in proximity to the heating element such that the heating element can at least partially melt the meltable material. The proximity necessary will depend on the melting characteristics of the meltable material as well as the heating capacity of the heating element. The heating element may or may not be encompassed within the same substrate as the meltable material.

"Diaphragm" as used herein refers to an element capable of being manipulated such that it can at least partially block the passage of fluid in a channel in one position (extended) and permit the flow of fluid in a channel in another position. An "actuating force" is a force that is capable of extending a diaphragm. A "valve seat" is an element designed to accept a portion of the diaphragm when extended. A "movement means" is a means capable of moving liquified meltable material (e.g., force air, magnetic field, etc.).

"Positive pressure" shall be defined, for example, as air pressure that is higher that the local ambient air pressure.

"Negative pressure" or "vacuum" shall be defined as, for example, air pressure that is lower than the local ambient air pressure.

"Electrostatic microvalve" shall be defined as a microvalve that requires no energy input to remain in the opened or closed position.

"Junction" shall be defined as the intersection of two or more items. For example, in one embodiment of the present invention, a junction is the intersection of a first and second microchannel. In one embodiment, the present invention contemplates that junction may be in any form. In a preferred embodiment, the junction is either in a "Y" or "T" form. On the other hand, a junction can be configured at any angle.

A "gas source" shall be defined as a device that provides positive or negative gas pressure. It is contemplated that a single device is capable of providing both the positive and negative gas pressure. It is further contemplated that separate devices can be used to provide positive and negative air pressure. "Applying pressure" shall be defined as an increase in positive pressure above ambient pressure.

"Inlet port" shall be defined as an opening that permits the addition or introduction of a meltable material to a microchannel. The meltable material may be in either a solid, semi-solid or liquid form.

"Is associated with" shall be defined as in close physical proximity to another item or it shall be defined as being associated functionally with another item. Items that are in functional association need not be in physical proximity to each other. However, typically, items that are in functional association are in close proximity to each other.

"Linked" shall be defined as being in liquid or gaseous communication.

"Activating" and "activation" shall be defined as applying an energy source to a device or device element. For example, applying electromagnetic energy to a heater element is a form of activating an item.

"Remains substantially melted" shall be defined as remaining in a liquid or semi-liquid state.

"Plug" shall be defined as a solid or semi-solid material that blocks a microchannel preventing or substantially preventing the passage of liquids or gases. The meltable materials of the present invention serve as plugs when they are in a solid or semi-solid state and located at the junction of two or more microchannels.

"Block" and "blocking" shall be defined as preventing or substantially preventing the passage of liquids or gases, for example, by one or more of the meltable materials defined above. "Unblocking" and "unblocked" shall be defined as the removal of the one or more of the meltable materials thereby allowing the passage of liquids or gases.

"Approximately the same time" shall be defined as close in time. In the present invention, for example, "approximately the same time" shall be within 10 seconds, more preferably, within 4 seconds and, most preferably, within 1 second.

"Disposed in a substrate" shall be defined as, for example, being etched into a substrate or built onto a substrate.

DESCRIPTION OF THE INVENTION

Figure 1:
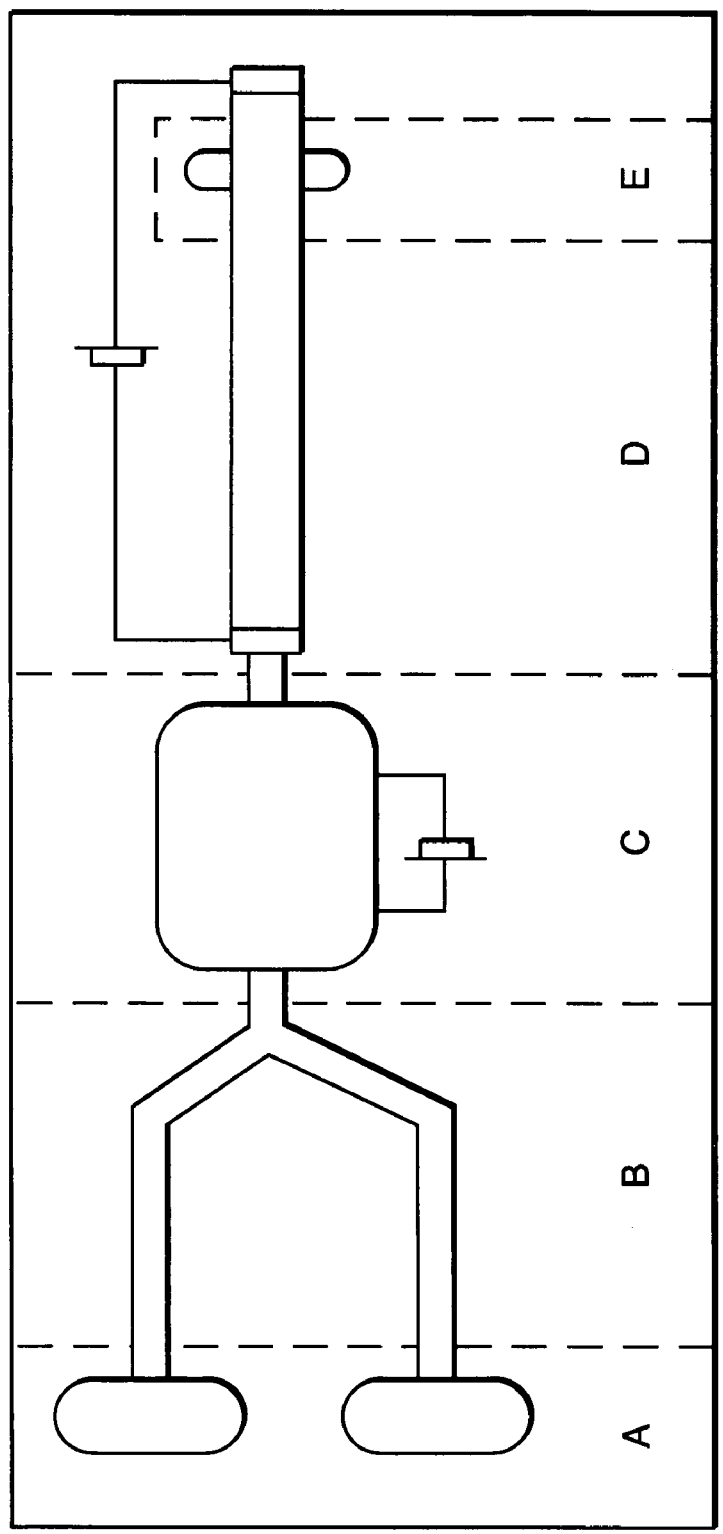
FIG. 1 is a schematic of an integrated analysis system of the present invention.

The present invention relates to microfabrication and biological reactions in microfabricated devices, and in particular, movement and mixing of biological samples in microdroplets through microchannels wherein said mixing and movement is controlled, at least in part by phase change latch valves. The description of the invention involves I) design of microscale devices (comprising microdroplet transport channels, reaction chambers, electrophoresis ports, and radiation detectors) using silicon and glass substrates, II) movement of discrete microdroplets using a surfacetension-gradient mechanism in which discrete microdroplets are differentially heated and propelled through etched channels, III) flow control with phase change latch valves and, IV) mixing of biological samples for reactions. The following U.S. Patents disclose methods of fabricating and microfabricating microscale devices and are incorporated herein by reference (U.S. Pat. Nos. 6,048,734; 6,507,149; 6,130,098; 6,271,021).

I. Design of MicroScale Devices

Although there are many formats, materials, and size scales for constructing integrated fluidic systems, the present invention contemplates silicon microfabricated devices as a cost-effective solution. Silicon is the material used for the construction of computing microprocessors and its fabrication technologies have developed at an unprecedented pace over the past 30 years. While this technology was initially applied to making microelectronic devices, the same techniques are currently being used for micromechanical systems.

Continuous flow liquid transport has been described using a microfluidic device developed with silicon. See J. Pfahler et al., Sensors and Actuators, A21–A23 (1990), pp. 431–434. Pumps have also been described, using external forces to create flow, based on micromachining of silicon. See H. T. G. Van Lintel et al., Sensors and Actuators 15:153–167 (1988). By contrast, the present invention employs discrete droplet transport in silicon (i.e., in contrast to continuous flow) using internal forces (i.e., in contrast to the use of external forces created by pumps).

As a mechanical building material, silicon has well-known fabrication characteristics. The economic attraction of silicon devices is that their associated micromachining technologies are, essentially, photographic reproduction techniques. In these processes, transparent templates or masks containing opaque designs are used to photodefine objects on the surface of the silicon substrate. The patterns on the templates are generated with computer-aided design programs and can delineate structures with line-widths of less than one micron. Once a template is generated, it can be used almost indefinitely to produce identical replicate structures. Consequently, even extremely complex micromachines can be reproduced in mass quantities and at low incremental unit cost—provided that all of the components are compatible with the silicon micromachining process. While other substrates, such as glass or quartz, can use photolithographic methods to construct microfabricated analysis devices, only silicon gives the added advantage of allowing a large variety of electronic components to be fabricated within the same structure.

In one embodiment, the present invention contemplates silicon micromachined components in an integrated analysis system, including the elements identified schematically in FIG. 1. In this proposed format, sample and reagent are injected into the device through entry ports (A) and they are transported as discrete droplets through channels (B) to a reaction chamber, such as a thermally controlled reactor where mixing and reactions (e.g., restriction enzyme digestion or nucleic acid amplification) occur (C). The biochemical products are then moved by the same method to an electrophoresis module (D) where migration data is collected by a detector (E) and transmitted to a recording instrument (not shown). Importantly, the fluidic and electronic components are designed to be fully compatible in function and construction with the biological reactions and reagents.

In silicon micromachining, a simple technique to form closed channels involves etching an open trough on the surface of a substrate and then bonding a second, unetched substrate over the open channel. There are a wide variety of isotropic and anisotropic etch reagents, either liquid or gaseous, that can produce channels with well-defined side walls and uniform etch depths. Since the paths of the channels are defined by the photo-process mask, the complexity of channel patterns on the device is virtually unlimited. Controlled etching can also produce sample entry holes that pass completely through the substrate, resulting in entry ports on the outside surface of the device connected to channel structures.

Figure 2:
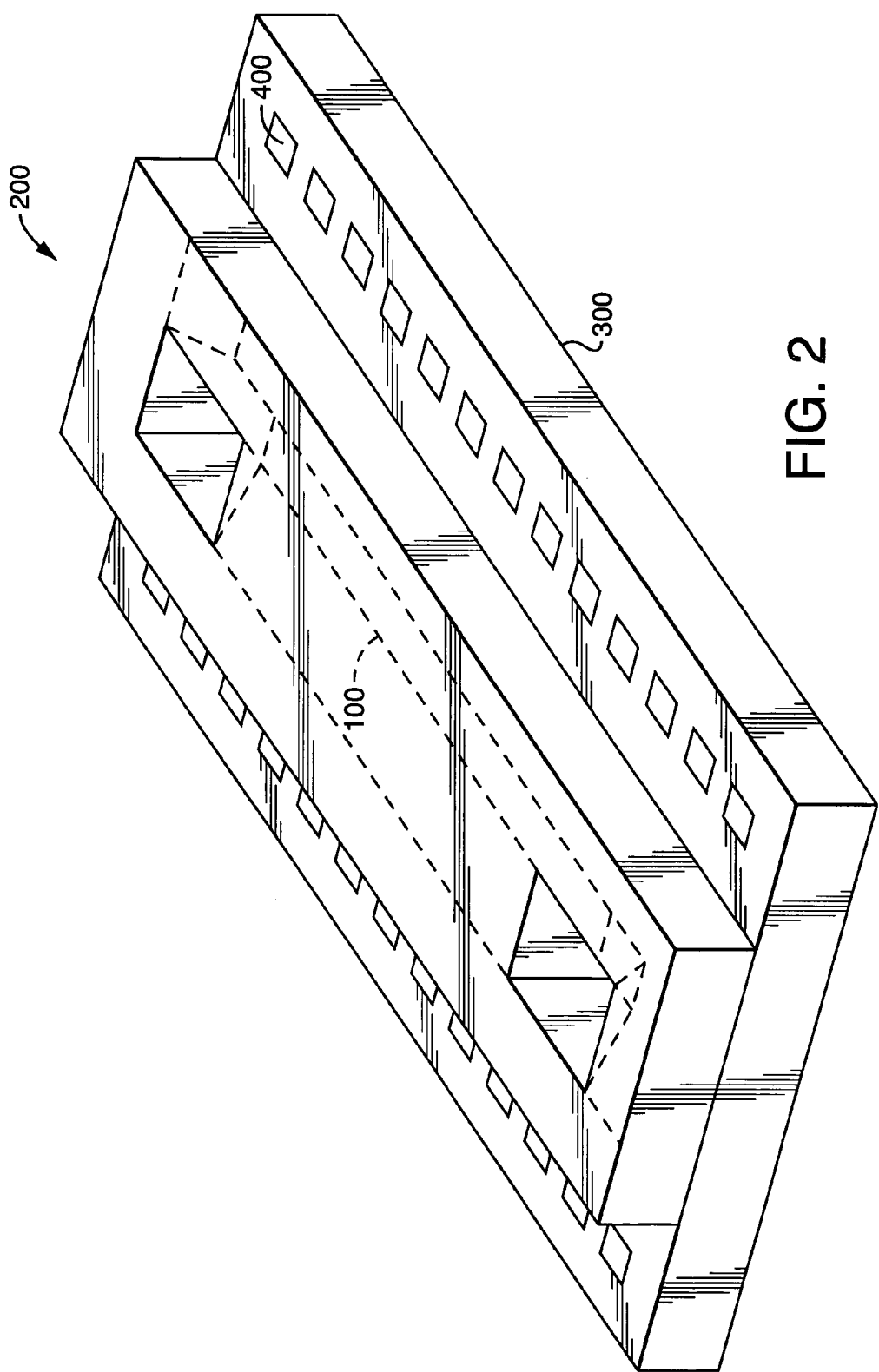
FIG. 2 shows a two-part approach to construction of a silicon device of the present invention.

FIG. 2 shows a two-part approach to construction. Microchannels (100) are made in the silicon substrate (200) and the structure is bonded to a glass substrate (300). The two-part channel construction technique requires alignment and bonding processes but is amenable to a variety of substrates and channel profiles. In other words, for manufacturing purposes, the two-part approach allows for customizing one piece (i.e., the silicon with channels and reaction formats) and bonding with a standardized (non-customized) second piece, e.g., containing standard electrical pads (400).

II. Movement of Discrete MicroDroplets

Figure 3:
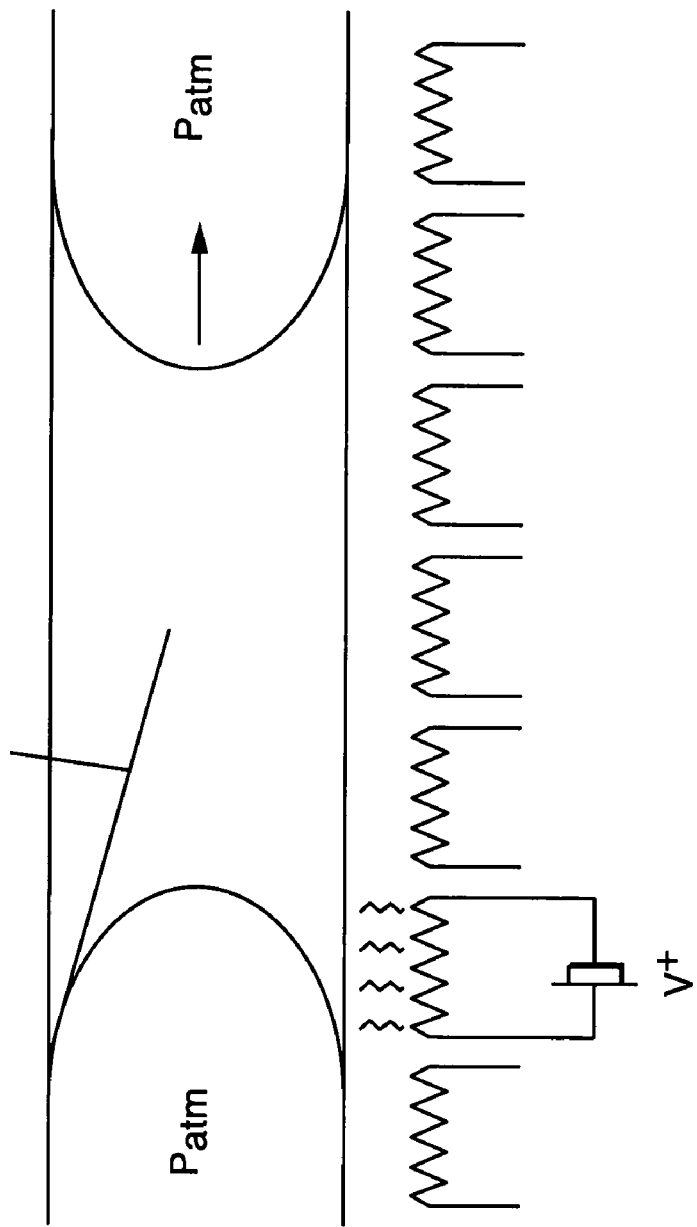
FIG. 3 is a schematic showing the principle of thermally-induced liquid microdroplet motion in a closed channel.

The present invention describes the controlled movement of liquid samples in discrete droplets in silicon. Discrete droplet transport involves a system using enclosed channels or tubes to transport the liquid to the desired locations (see, section B on FIG. 1). Within the channels, discrete liquid reagent microdroplets can be injected, measured, and moved between the biochemical analysis components. Discrete droplet movement has three advantages. First, each sample droplet is separated from all others so that the risk of contamination is reduced. Second, in a uniform channel, the volume of each sample can be determined by merely measuring the droplet length. Third, the motion of these droplets can be accomplished with simple heating (i.e., using internal forces and no moving parts). Movement is performed using thermal gradients to change the interfacial tension at the front or back of the droplets and, thus, generate pressure differences across the droplet (FIG. 3). For example, a droplet in a hydrophilic channel can be propelled forward by heating the back interface. The local increase in temperature reduces the surface tension on the back surface of the droplet and, therefore, decreases the interfacial pressure difference. The decreased pressure difference corresponds to an increase in the local internal pressure on that end of the droplet ($P_1$ increases). The two droplet interfaces are no longer in equilibrium, with $P_1$ greater than $P_2$, and the pressure difference propels the droplet forward.

That is to say, forward motion can be maintained by continuing to heat the droplet at the rear surface with successive heaters along the channel, while heating the front surface can be used to reverse the motion of the droplet. Applying a voltage to the wire beneath the channel generates heat under the edge of the droplet. Heating the left interface increases the internal pressure on that end of the droplet and forces the entire droplet to the right. The pressure on the interior of the droplet can be calculated knowing the atmospheric pressure, $P_{aim}$, the surface tension, $\sigma$, and the dimensions of the channel. For a circular cross-section, the interior pressure, $P_i$, is given by $P_i = P_{aim} - (4\sigma\cos\theta)/d$ where d is the diameter of the channel and $\theta$ is the contact angle. Since $\sigma$ is a function of temperature ($\sigma = \sigma_o(1-bT)$ where $\sigma_o$ and b are positive constants and T is the temperature), increasing the temperature on the left end of the droplet decreases the surface tension and, therefore, increases the internal pressure on that end. The pressure difference between the two ends then pushes the droplet towards the direction of lower pressure (i.e., towards the right). The aqueous droplet shown is in a hydrophilic channel ($0<\theta<90$); for a hydrophobic channel ($90<\theta<180$), heating the right edge would make the droplet move to the right.

Contact angle hysteresis (the contact angle on the advancing edge of the droplet is larger than the contact angle on the retreating edge) requires a minimum temperature difference before movement will occur. The velocity of the droplet after motion begins can be approximated using the equation $v=\Delta EPd^2/32 \mu L$ where $\Delta EP$ is the pressure difference, $\mu$ is the viscosity of the solution, and L is the length of the droplet. The present invention contemplates temperature differences of greater than thirty (30) degrees Centigrade to create movement. Experiments using temperature sensors arrayed along the entire channel indicate that a differential of approximately 40° C. across the droplet is sufficient to provide motion. In these experiments, the channel cross-section was 20 μm×500 μm, and the volume of each of these droplets can be calculated from their lengths and is approximately 100 nanoliters for a 1 cm long droplet.

III. Flow Control (Regulation) with Phase Change Latch Valves

A) Concept

The present invention contemplates the use of sealed valves (for example, phase change latch valves) to control and regulate fluid flow. While the present invention is not limited to a particular sealing method, in one embodiment, the valves of the present invention are free from diaphragms and other mechanical elements that function as liquid seals. In the context of the present invention, meltable substances are not considered to be mechanical elements but, rather, are considered to be liquifiable elements.

Figure 4:
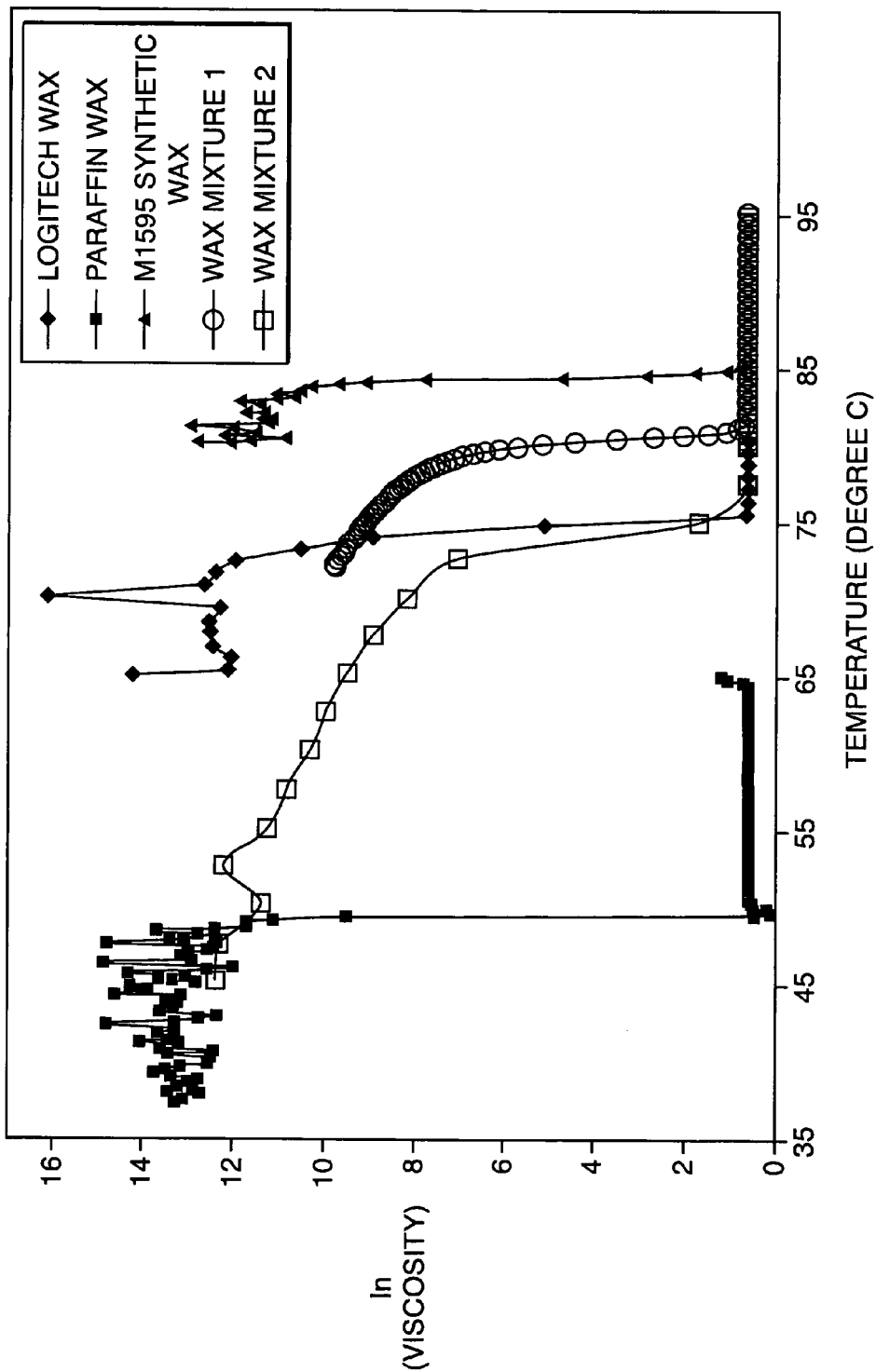
FIG. 4 shows the viscosity of different waxes and blends of waxes as a function of temperature as measured on a constant stress rheometer.

The characterization of the valve involves a suitable choice of the phase-change material. First, we have to understand the property of this material, most importantly the temperature response and the surface interaction. A sharp transition from the liquid to the solid phase at the melting point is beneficial, but not essential, to realize the valve at the exact position as defined by the gradient. Viscosity of the phase change material can be measured as a function of temperature in a constant stress cone and plate rheometer. As seen from FIG. 4, wax exhibits a sharp transition from the liquid to the solid phase and is the preferred choice for the phase change material, though the general concept is applicable to a range of meltable materials like electrorheological fluids, swellable colloidal solutions plastics, solder, polymers, etc. An attempt was made to tailor the transition point of the meltable material blends to a desired temperature. Surface interaction of the wax is important so that the meltable material does not leave behind any residue in the stem channel for it to be used repeatedly. For this the contact angle of the meltable material will be measured by placing it in the molten state on different surfaces. Once an appropriate surface is identified a photolithographic method would be found to pattern this surface in specific sections of the channels.

Second, the strategic placement of heaters and tailoring of the energy pulse is used to realize an appropriate temperature profile. This involves the ability to generate very short well-defined energy pulses and accurate measurement of temperature to profile the temperature response generated by these pulses. LABVIEW™ (National Instruments Corporation, Austin, Tex.) relays would be used to realize these energy pulses. An accurate method for measuring the temperature at the exact points would be developed (Lao, A. I. K, et al., Sens. Actuators A. Phys., 84:11–17, 2000). Different substrates with different thermal conductivity would also be used to lower the energy for generating these pulses (Brahmasandra, S. N., et al., Sens. Actuators A. Phys., (A95:2–3); 250–258, 2002).

Figure 5C:
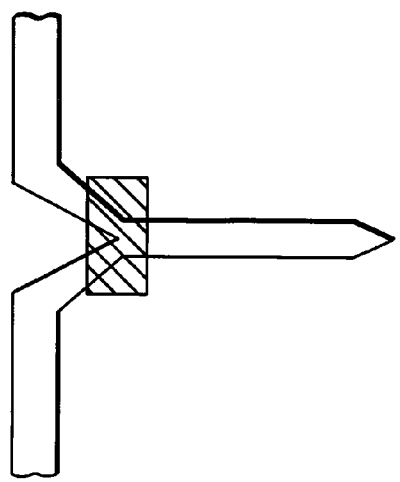
FIG. 5 shows the different generations of the wax valve: a) initial prototype; b) modified intersection and inlet port for better fluidics; and c) intersection patterned to make it thermodynamically unstable for the wax.
Figure 5B:
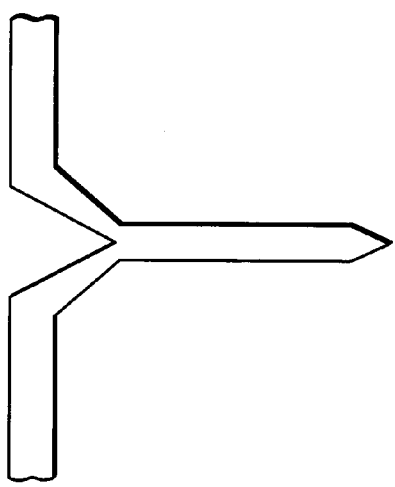
Figure 5A:
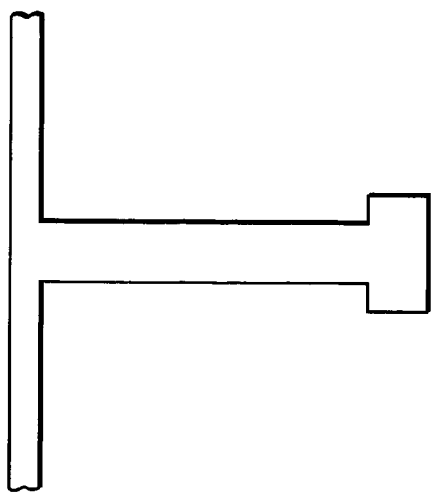

Third, the intersection is appropriately designed so that the motion of the meltable material is tailored to close and open without the meltable material going into unwanted areas. This is done by either tailoring fluidic resistances in channels, by making specific areas on the chip thermodynamically unstable for the meltable material to be in or both. Different valve designs have been fabricated and tested. The intersection may be a "T" to a "Y" configuration (FIGS. 5a and 5b). In either case, the intersection is so designed that it is in conformation with the radial temperature gradients generated by the pulse. In the third design (FIG. 5c) the valve intersection is patterned so that the meltable material prefers the stem channel as compared to the intersection.

Fourth, the biocompatability of these valves for integration in the "lab-on-chip" was tested. For this, a Polymerase Chain Reaction (PCR) in presence of all the different waxes was performed. The results of this PCR was compared to that of a PCR in the absence of valves. The results showed successful operation of the micro-PCR protocol.

Finally, the valve must not leak and must have adequate response time and hysteresis.

B) Valve Design to Eliminate External Pressure/Vacuum

Figure 6:
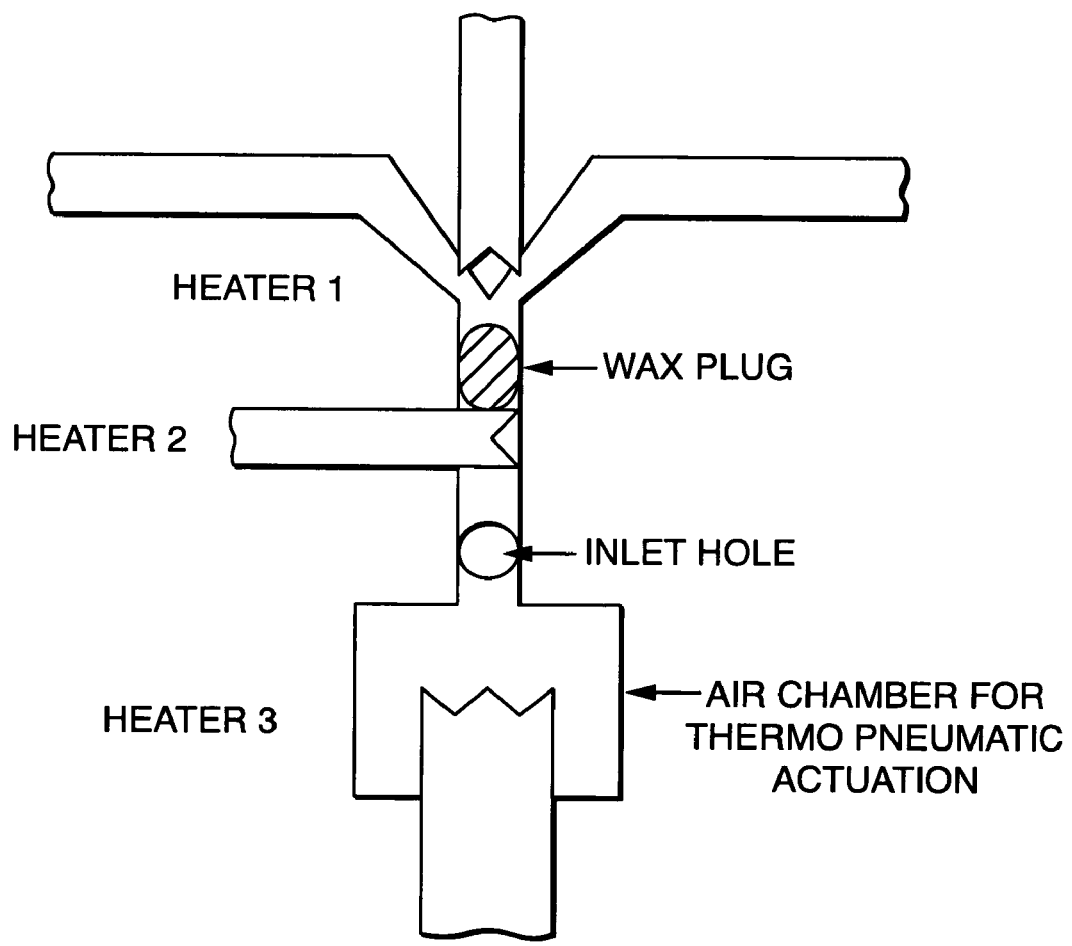
FIG. 6 shows the proposed design for a valve that eliminates the use of external pressure and vacuum.
Figure 7A:
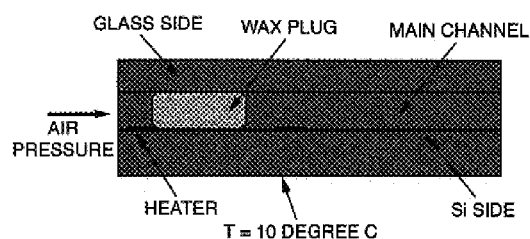
FIG. 7 shows a cross sectional view of a moving wax plug in microchannels: a) loading the plug; b) firing heaters sets up a temperature gradient and melts the wax plug; c) air pressure pushes the molten plug forward to be stopped by a cold front; and d) the final plug position with the heaters turned off.
Figure 7B:
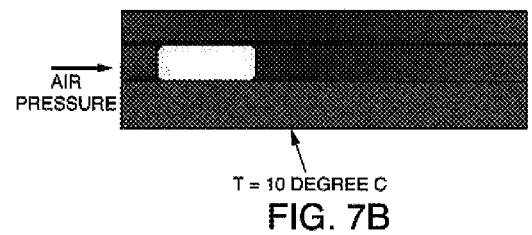
Figure 7C:
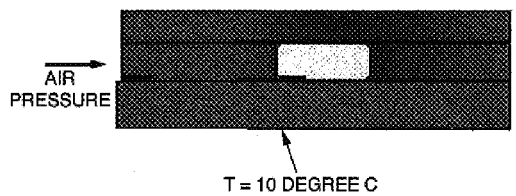
Figure 7D:
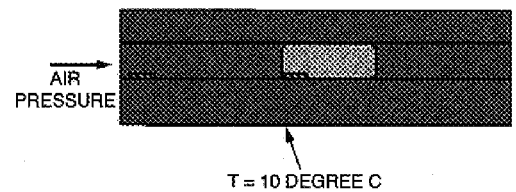

A valve unit that does not require external pressure or vacuum is also contemplated by the present invention. As seen from the generic design (FIG. 6) it is similar to its predecessor except for the addition of an expansion chamber and the lack of an air pressure generating means. In one embodiment, the valve is closed by pulsing heater 2 and heater 3. Pulsing heater 2 melts the meltable material and heater 3 expands the air moving the meltable material plug forward. Although the present invention is not limited to any particular mechanism or theory, this is similar to (though not identical to) thermopneumatic actuation (Handique, K., et al., Anal. Chem., 73:1831–1838, 2001). Once the valve is closed, both of the heaters would be shut off. The design of the closing means would leave the solid plug of the closed valve under vacuum. In one embodiment, to open the valve only heater 3 would have to be pulsed. In another embodiment, if there is leakage (in which case the vacuum might be hindered by air leaking into the expansion chamber), for opening heater 1 would be pulsed at time t=0. This would let the air expand and escape through the matrix. Then, at time t>0 we would pulse heater 3 and simultaneously switch heater 1 off. Since no leakage can occur through the liquid plug, the vacuum would pull the plug back. Either, the expansion chamber and the meltable material plug can be thermally isolated or the heat transfer can be integrated for lower power consumption (Brahmasandra, S. N., et al., Sens. Actuators A. Phys., (A95:2–3); 250–258, 2002).

C) Mathematical Modeling of Molten Valve

Theoretical modeling and simulation of the phase change latch valve was done to optimize the valve design and predict valve operation. The valve shape used to facilitate the motion of meltable material plug along a desired direction was theoretically predicted. This reduced the number of designs that needed to be experimentally tested. Prediction of the valve operation was done to predict the position of the meltable material plug as a function of the energy pulse intensity and other parameters. This facilitated the initial sizing of the valve and determined the energy pulse required to actuate the valves for different system and environmental conditions.

i) Optimizing the Valve Design

The shape of the valve intersection was optimized for the valve to enable it to open without leaving behind any residue. If the internal pressure in the molten drop (i.e., the meltable material) at the interface in the stem channel (i.e., side channel) was, then the pressure at the interfaces in the intersection then the meltable material would have a tendency to move into the stem channel and open cleanly (FIG. 5). Thus, $$P_3, P_2 > P_1 \quad (2.1)$$

where $P_1$ is the pressure in liquid side of an gas/liquid interface and is determined by the Young-Laplace relation $$P_1 = P_g - 2\sigma\cos\theta(1/d + 1/w) \quad (2.2)$$

where $P_g$ is the pressure in gas side of an gas/liquid interface, and

σ is the surface tension, and
θ is the contact angle, and
d is the depth of the channel, and
w is the width of the channel.

As seen from Equation 2.2, $P_1$ can be tailored by optimizing the surface chemistry (σ,θ) and channel geometry (w, d). Appropriate designs based on the knowledge of the contact angle were constructed and tested for performance.

ii) Prediction of Valve Operation

The theoretical modeling of the valve involves coupling heat transfer on the chip with fluid mechanics of the meltable material plug (FIG. 7). The first step here was to model the heat transfer associated with this transient energy pulse. The temperature profile was predicted as a function of time and spatial position as the chip heated up and cooled down. Next, the melting/solidification dynamics of the wax plug were coupled with the temperature profile. Finally, the motion of the molten plug was determined by solving the Navier's-Stoke equation.

The generalized heat transfer via conduction in any medium is given by $$\rho C_p \frac{\partial T}{\partial t} = \nabla \cdot (k \nabla T) + q \quad (2.3)$$

where T is the temperature at any point and at any time t, and r is the density of the medium, and
Cp is the specific heat, and
k is the thermal conductivity, and
q is the heat generation term.

Figure 8:
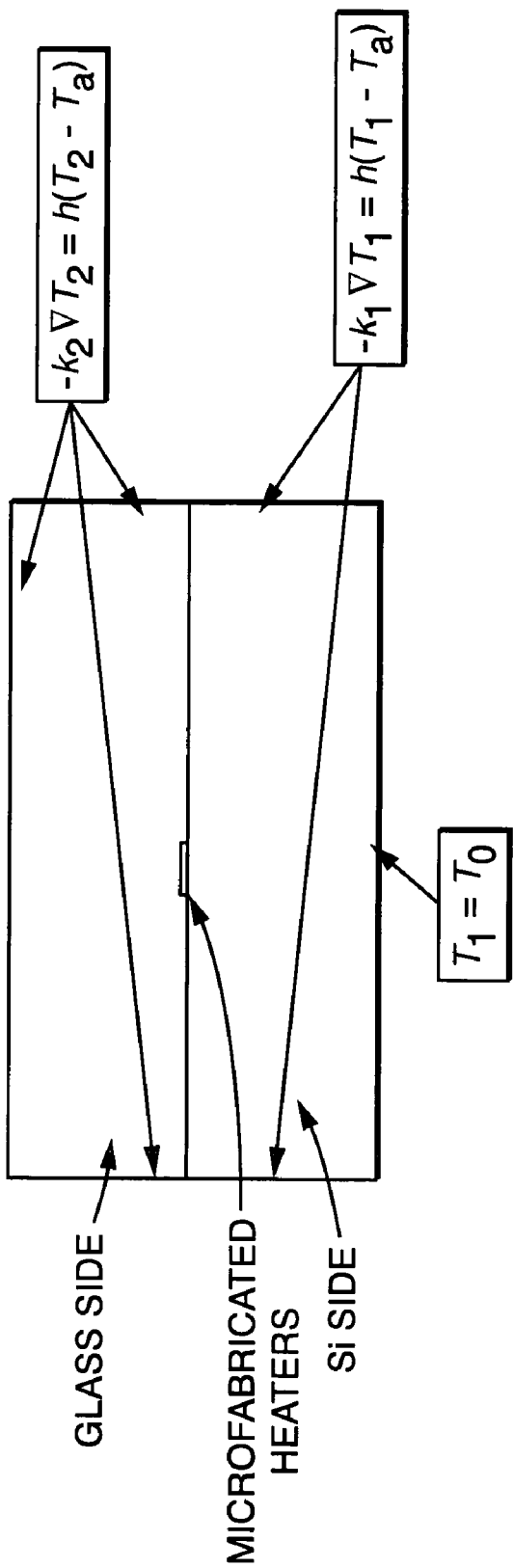
FIG. 8 shows the boundary conditions of the mathematical formation of the problem.

The boundary conditions are specific to the way the chip is configured (FIG. 8).

The energy generated (Q) by the energy pulse is given by $$Q = V^2/R \quad (2.4)$$

where V is the voltage supplied and R is the resistance of the heater element

If the duration of the pulse is Δt, then for t>Δt and Q=0 the temperature profile on the chip at Δt would be the starting value of the cool down phase. As a first assumption, $$q = Q, \; t \leq \Delta t, \text{ or}$$

$$q = Q, t > \Delta t. \quad (2.5)$$

There were two complications that needed to be addressed for the solution of equation 2.3. First, a part ($Q_1$) of q would be used to raise the temperature and melt the meltable material $$Q_1 = m\lambda + mcp\Delta T \quad (2.6)$$

where m is the mass of the meltable material plug, and
λ is the latent heat of wax, and
$C_p$ is the specific heat of the wax.

Second, during the cooling phase of the initial conditions there was the temperature profile at the end of energy pulse.

The solution that is needed is the position vs. time relation for the melting temperature of meltable material on the chip. This is because the melting point defined the liquid/solid interface and, hence, the position where the motions of a molten meltable material drop would cease.

There are three possible ways for solving Equation 2.3 for the temperature profile: 1) obtain an analytical solution using Fourier transform (Kurabayashi, K and Goodman, K. E., IEEE transcripts on components, packaging and manufacturing technology (Part A), 21 (3): 506–514, 1998); 2) obtain a numerical solution by a finite element technique (Sammarco, T S and Burns, M. A., J. Micromech. Microeng., 10:42–55, 2000); or 3) obtain a solution using simulation software like FEMLAB™ (COMSOL, Inc., Burlington, Mass.) or ANSYS™ (ANSYS Inc., Canonsburg, Pa.)

The solution for the temperature profile needs to be coupled with the melting/solidification dynamics. Let $t_1$ be the time for melting the wax. There would be no movement of the wax before this time. The time for melting the wax can be approximately determined as follows. Assume that at any point the T(x, y, z, t) is known as a function of Q.

The flux at any point is given by:

$$Q_w = k\nabla T \quad (2.7)$$

The energy supplied is given by:

$$dE + Q_w dAdt \quad (2.8)$$

Integrating the energy over time and length of the wax plug and equating it to time would give us the $t_1$, i.e., the time to melt the plug.

$$Q_1 = \int_0^{t_1} \int k\nabla T(x, t) dA \, dt \quad (2.9)$$

This equation would be solved for $t_1$.

Now the fluid motion will be modeled. The velocity of the molten meltable material was given by the solution to the Navier-Stoke's equation:

$$\rho \frac{Dv_x}{Dt} = \frac{\partial}{\partial x}\left(-p + 2\mu\frac{\partial v_x}{\partial x} - \frac{2}{3}\mu\nabla \cdot v\right) + \quad (2.10)$$
$$\frac{\partial}{\partial y}\left[\mu\left(\frac{\partial v_x}{\partial y} + \frac{\partial v_y}{\partial x}\right)\right] + \frac{\partial}{\partial z}\left[\mu\left(\frac{\partial v_x}{\partial z} + \frac{\partial v_z}{\partial x}\right)\right] + \rho g_x$$

The solution of this equation involved understanding the viscosity/stress behavior of the molten meltable material. A solution for Newtonian, fully developed laminar flow for channels with L/d>100 (Poisuelle flow), assuming no slip condition at the wall, was given by (Sammarco, T. S. and Burns, M. A., AIChE J., 45:350–366, 1999).

$$v = \frac{Gd}{S\mu L}[(a - bT_A)\cos\theta_A - (a - bT_R)\cos\theta_R] + \frac{\Delta P_e d^2}{S\mu L} + \frac{d^2 \rho g \sin\phi}{S\mu} \quad (2.11)$$

where G, S are constants specific to channel geometry, and

L is the length of the drop, and $\theta_A$, $\theta_R$ are the advancing and receding contact angles, and $\mu$ is the viscosity of the drop, and a, b are the positive empirical constant for estimating surface tension, and $\Delta P_e$ is the external pressure applied to the drop, and Ø is the inclination of the channel with the horizontal plane.

From equation 2.11 the position of the wax as a function of time was deduced.

These assumptions will be verified and if any deviation is found the velocity profile will be given by the solution of 2.10. The coupling of the temperature and velocity profile will determine the position of the valve latching.

D) Microvalve Array

Figure 9:
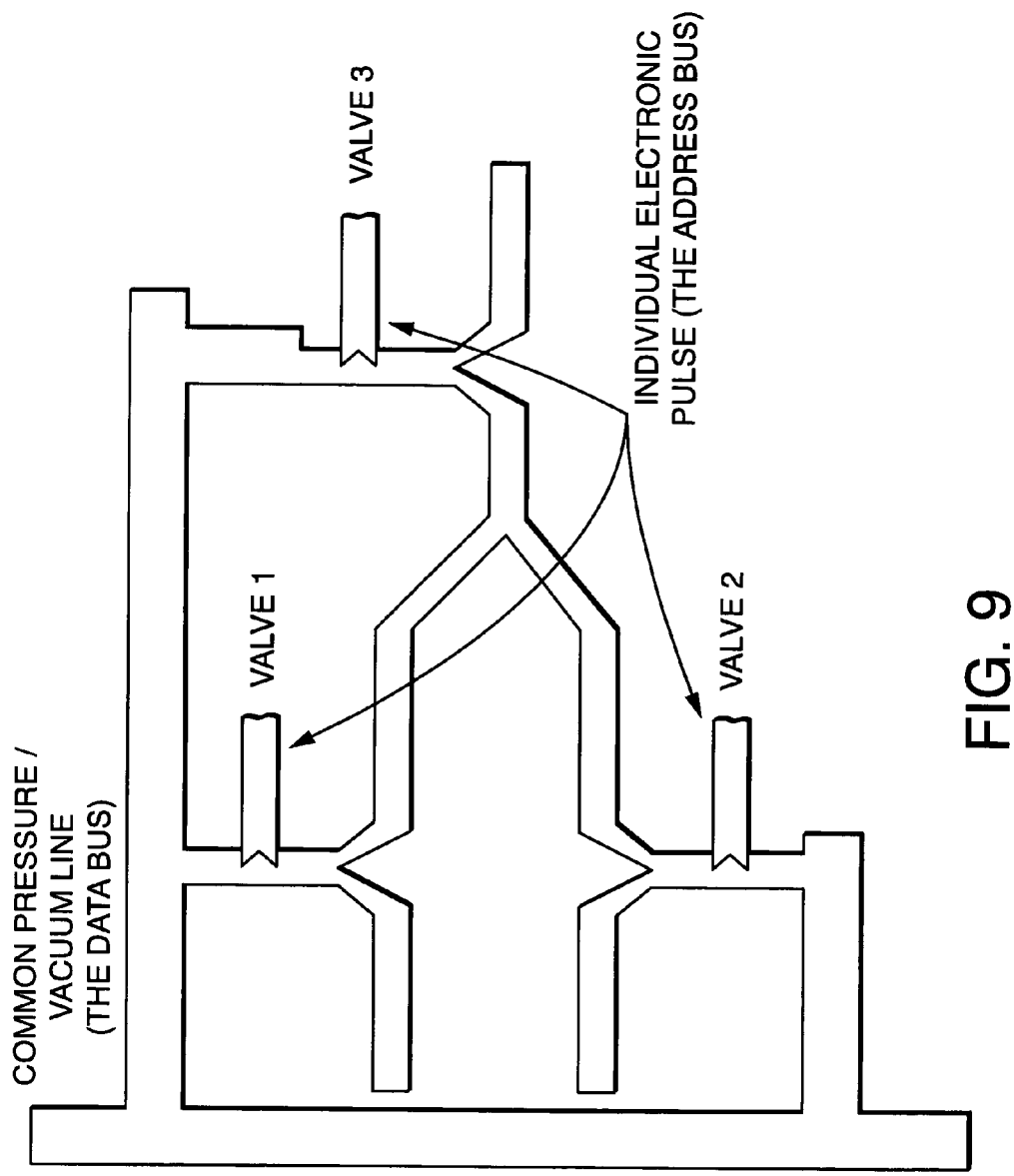
FIG. 9 shows a microvalve array with two valves. The valves have a common pressure/vacuum line (data) and independent actuation (address).

In one embodiment of the present invention, a microvalve array is contemplated. The concept of the microvalve array operation is analogous to the address and the data bus concept in the electronics industry. Here, the electrical signal to the heater causing the meltable material to melt is the "address" while the port pressure or vacuum causing the valve to either open or close in the "data." All the valves have a common "data" line that can be switched between pressure (i.e., positive air pressure) or vacuum (i.e., negative air pressure). The "address" signal would come from LAB-VIEW™ relays. The "address" is programmed to perform fluidic motion analogous to LOGIC implementation in the electronics industry. Consider the relatively simple but fundamental fluidic network (e.g., FIG. 9) where there are two valves in an array. Depending on what signal we give to the address and data either valve can open or close independently of each other.

i) Integrated System with Microvalve Array

Figure 10:
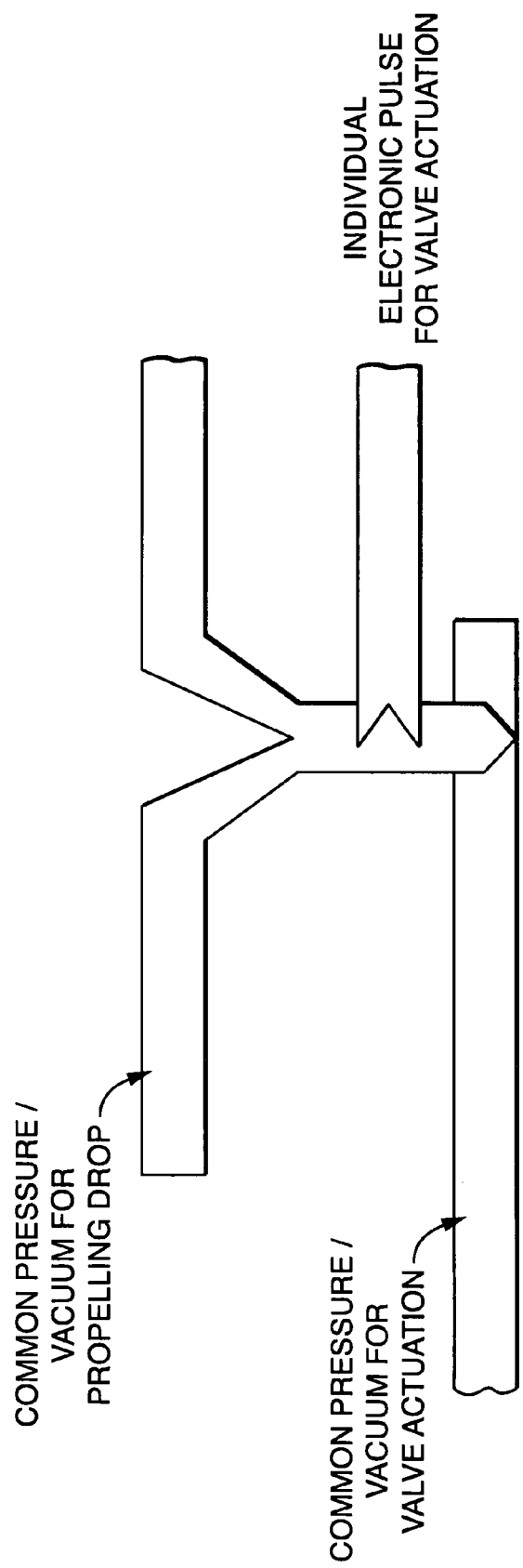
FIG. 10 shows a single unit of the valve array to perform drop motion on the chip.

Fluidic manipulation on a lab-on-a-chip with a microvalve array were performed. Once a single unit valve was tested for robustness it was integrated on a chip which performed a genotyping or sequencing function. The operations performed by these microvalves on a chip include manipulating fluid flow both in space and time, sealing reaction chambers to prevent evaporation and isolating sections on the chip as well as isolating the chip from the environment. Based on the specific function performed by a microvalve it can be classified as a process microvalve or a pumping microvalve. Process microvalves (FIG. 9) are valves in which both the inlet and outlet of the valve are process channels while in a pumping microvalve (FIG. 10) the inlet is connected to a pressure source while the outlet is a process channel. Both these valves in the array have identical "address-data bus" type implementation.

ii) Process Microvalve Array

Figure 11:
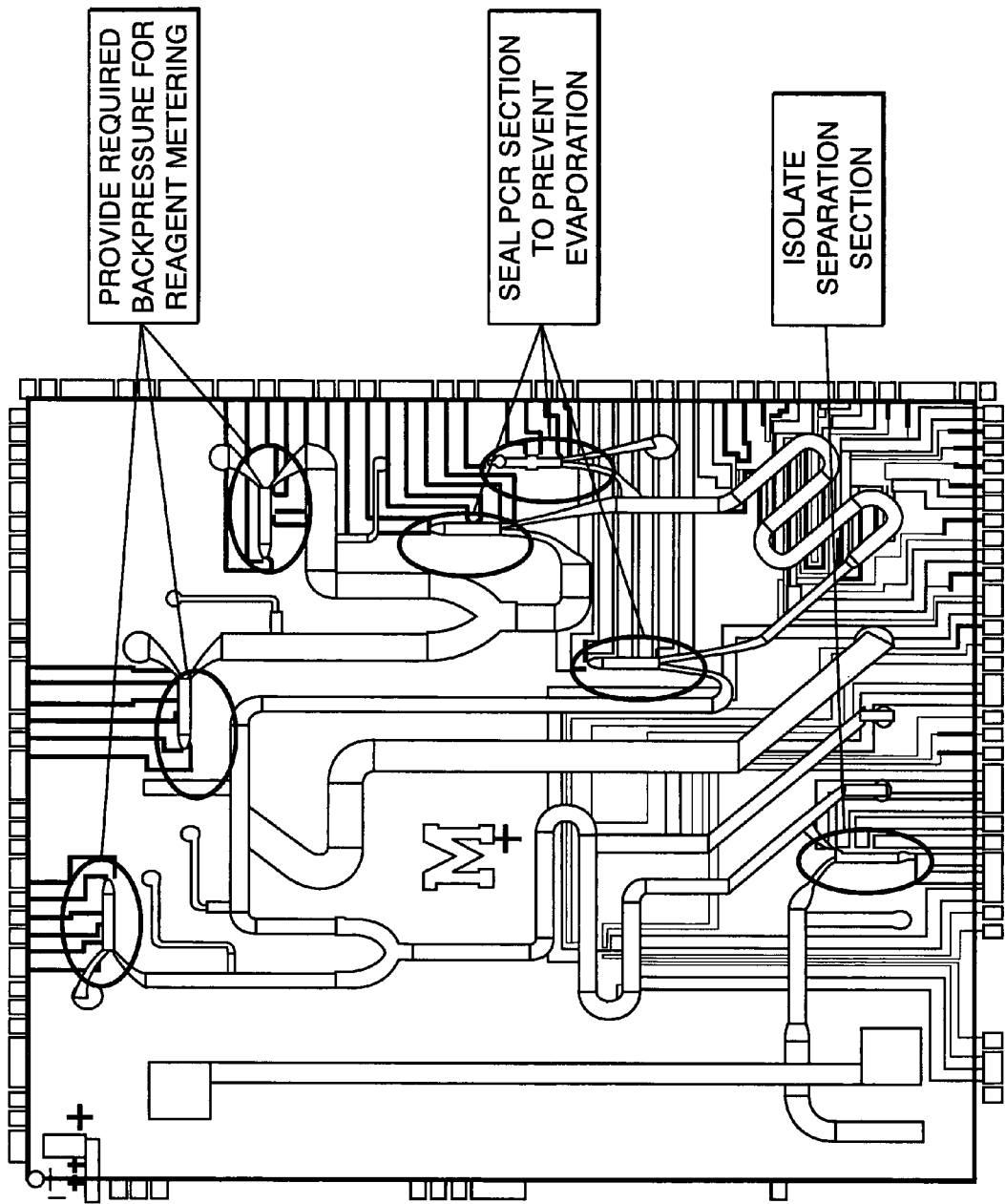
FIG. 11 shows the layout of the valved genetyper.

Process microvalves are used for sealing reaction chambers to prevent evaporation and reagent dynamics during a thermal reaction, for sealing the sample injection ports to provide the back pressure for sample metering and for isolating a section of the chip. A process microvalve array was integrated on a genotyping integrated device, the Valved Genotyper. The design for the Valved Genotyper is shown in FIG. 11. This device has 7 process valves and performs three sample metering, a Polymerase Chain Reaction, followed by a Restriction Digest reaction, followed by a separation. This design was fabricated and is currently being used.

iii) Pumping Microvalve Array

Figure 12:
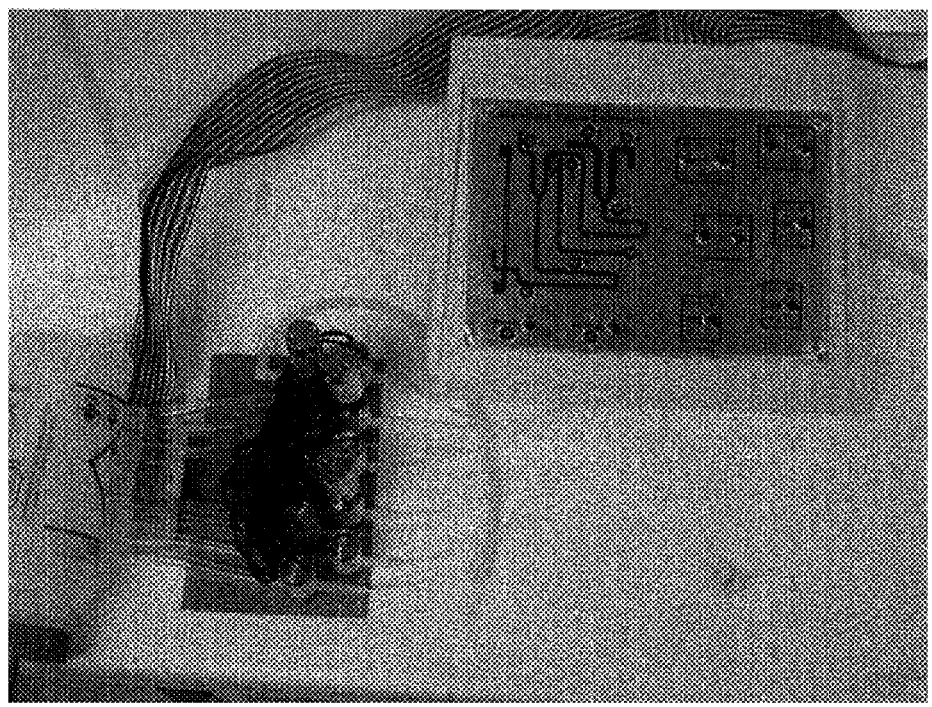
FIG. 12 shows an embodiment of the current setup to perform drop motion on the chip.

A pumping microvalve array is used to direct air pressure to propel drops in the microchannels. A single unit (FIG. 10) of this array has two common air/vacuum ports. One is used for valve actuation. The other provides the air pressure to propel liquid drops on the chip. Since these valves are independently controlled, the desired drop motion can be achieved by opening/closing appropriate valves on the chip. The fluid motion on prior art chips is controlled by actuating external solenoid valve that are interfaced to the chip using a manifold (FIG. 12). Not only are these types of valves bulky but they also introduce enormous dead volumes. These prior art solenoid valves and the manifold were replaced by an on-chip microvalve array.

iv) Valve Packing Density

When a large number of valves need to be fabricated on a chip the space occupied by these valves is an important issue. The number of valves per unit area depends on the physical dimensions of the valve and size of the "address" signal on the chip. The chip is optimized for the maximum packaging density (Sammarco, T S and Burns, M. A., J. Micromech. Microeng., 10:42–55, 2000). One of the controlling factors here is the shape of the temperature gradients. Steep gradients would reduce the size of the temperature spread when a valve is addressed. In another embodiment, suspended heaters, where the area below the heater is etched away, are used.

v) Valve Array Performance

The array involves valves opening and closing multiple times and, hence, the valve operation needs to be optimized for multiple usages. The two main areas that were investigated was meltable material melting point hysteresis and wax residue in channels.

The melting point of compounds with long carbon chains changes as the compound is subjected to multiple heating and cooling cycles, i.e., the compound is subject to what is called "melting point hysteresis." A theoretical study of the effects of change in melting point of wax was used to predict its influence on valve dynamics. The channel shape and/or the heating pulse was tailored for optimal valve performance. The residue left on the channel by the molten plug modifies the surface property of the channel. The extent of the residue is a function of surface coating and wax chemistry. This data was used to optimize the valve dynamics.

IV. Mixing Biological Samples in Reactions

Figure 13A:
FIG. 13a shows a selected frame of a videotape wherein two microdroplets are at their starting locations in the branches of the Y-channel.
Figure 13B:
FIG. 13b shows movement by heating the left interface of both microdroplets.
Figure 13C:
FIG. 13c shows the microdroplets at the intersection.

Droplet motion (described generally above) is contemplated as one step in a pathway. The other steps typically involve sample mixing and a controlled reaction. For example, the integral heaters arrayed along the entire surface of the channel used for droplet motion also allow for a region of a channel to be used as a thermal reaction chamber. For sample mixing prior to the reaction, a Y-channel device is contemplated (FIG. 13a). In such a device, a first droplet containing a first sample (e.g., nucleic acid) is moved along one channel of the Y-channel device, and a second droplet containing a second sample (e.g., a restriction digest enzyme in digestion buffer) is moved along the other channel of the Y-channel device (FIGS. 13b and 13c).

Following sample merging (FIG. 13d), there is the concern that the combined samples have not been properly mixed. That is to say, if two similar microdroplets enter the single channel in laminar flow at the same flow rate, they will form an axially uniform droplet but will not be mixed width-wise. Width-mixing can be accomplished in a number of ways.

First, there is simple diffusion, although, for large DNA molecules, the characteristic time for this mixing could be on the order of several hours or more. Circulation patterns generated inside the droplets during movement and heating significantly reduce this time. In this regard, the present invention contemplates maintaining the mixture as a heated mixture (e.g., maintaining the temperature at 65° C. for 10 minutes) using the integral heaters and temperature sensors.

Second, the present invention contemplates mixing by reversing the flow direction of the mixture over a relatively short distance in the channel. While a variety of reverse flow approaches are possible, one or two direction changes over a distance comprising approximately two droplet lengths has been found to be adequate.

Finally, there is the mixing approach wherein the mixture is moved against or over physical obstacles. For example, the mixture can be either "crashed" back against merge point of the Y-channel or simply moved over deliberate imperfections in the channel (i.e., "roller coaster" mixing).

Successful mixing, of course, can be confirmed by characterization of the product(s) from the reaction. Where product is detected, mixing has been at least partially successful. The present invention contemplates, in one embodiment, using electrophoresis to confirm product formation.

DESCRIPTION OF PREFERRED EMBODIMENTS

The description of the preferred embodiments involves: I) microfabrication techniques for manufacture of silicon-based devices; II) channel treatment for optimum flow and reproducibility; III) component design (particularly the electrophoresis module and the radiation detectors) and, IV) phase change latch valve design.

I. Microfabrication of Silicon-Based Devices

As noted previously, silicon has well-known fabrication characteristics and associated photographic reproduction techniques. The principal modern method for fabricating semiconductor integrated circuits is the so-called planar process. The planar process relies on the unique characteristics of silicon and comprises a complex sequence of manufacturing steps involving deposition, oxidation, photolithography, diffusion and/or ion implantation, and metallization, to fabricate a "layered" integrated circuit device in a silicon substrate. See, e.g., W. Miller, U.S. Pat. No. 5,091,328, hereby incorporated by reference.

For example, oxidation of a crystalline silicon substrate results in the formation of a layer of silicon dioxide on the substrate surface. Photolithography can then be used to selectively pattern and etch the silicon dioxide layer to expose a portion of the underlying substrate. These openings in the silicon dioxide layer allow for the introduction ("doping") of ions ("dopant") into defined areas of the underlying silicon. The silicon dioxide acts as a mask; that is, doping only occurs where there are openings. Careful control of the doping process and of the type of dopant allows for the creation of localized areas of different electrical resistivity in the silicon. The particular placement of acceptor ion-doped (positive free hole, "p") regions and donor ion-doped (negative free electron, "n") regions in large part defines the interrelated design of the transistors, resistors, capacitors and other circuit elements on the silicon wafer. Electrical interconnection and contact to the various p or n regions that make up the integrated circuit is made by a deposition of a thin film of conductive material, usually aluminum or polysilicon, thereby finalizing the design of the integrated circuit.

Of course, the particular fabrication process and sequence used will depend on the desired characteristics of the device. Today, one can choose from among a wide variety of devices and circuits to implement a desired digital or analog logic feature.

In a preferred embodiment, channels were prepared on 500 μm thick glass wafers (Dow Corning 7740) using standard aqueous-based etch procedures. The initial glass surface was cleaned and received two layers of electron beam evaporated metal (20 nm chromium followed by 50 nm gold). Photoresist Microposit 1813 (Shipley Co.) was applied 4000 rpm, 30 seconds; patterned using glass mask 1 and developed. The metal layers were etched in chromium etchant (Cr-14, Cyantek, Inc.) and gold etchant (Gold Etchant TFA, Transene Co.) until the pattern was clearly visible on the glass surface. The accessible glass was then etched in a solution of hydrofluoric acid and water (1:1, v/v). Etch rates were estimated using test wafers, with the final etch typically giving channel depths of 20 to 30 μm. For each wafer, the depth of the finished channel was determined using a surface profilometer. The final stripping (PRS-2000, J. T. Baker) removed both the remaining photoresist material and the overlying metal.

In one embodiment, channels etched on glass in the above-described manner, were bonded to the heater-element wafer in a two-part construction approach using optical adhesive (SK-9 Lens Bond, Sumers Laboratories, Fort Washington, Pa.). The bond was cured under an ultraviolet light source (365 μm) for 12 to 24 hours.

Figure 14A:
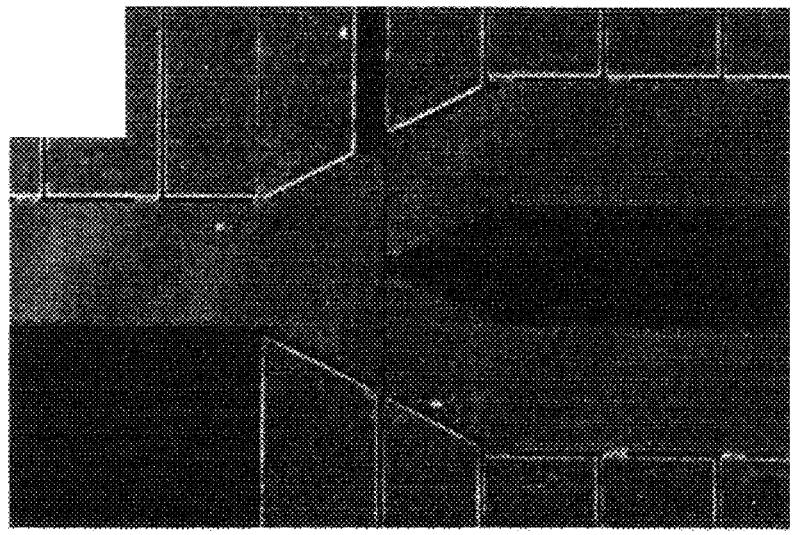
FIG. 14a is a photomicrograph of inlay-process heater elements on the surface of a silicon wafer.
Figure 14B:
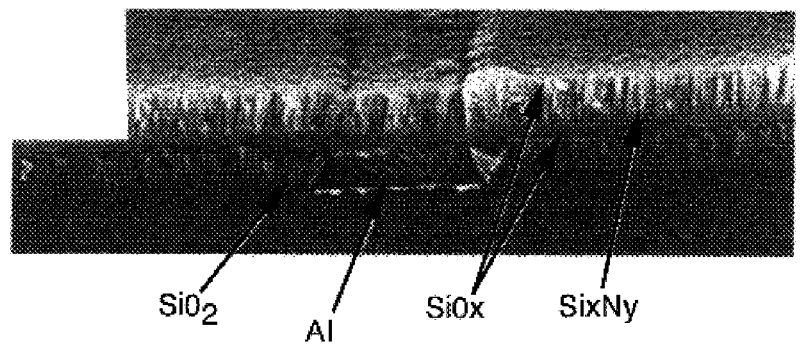
FIG. 14b is a scanning electron micrograph (SEM) of an inlay-process heater wire in cross section (the arrows indicate the deposited aluminum, silicon dioxide, and silicon nitride layers).

Initial device design by the present inventors involved single layers of silicon. However, experience showed these to be inadequate to prevent short circuiting due to (necessary) liquid microdroplets within the channels (see experiments described below). The preferred design involves a triple layer of oxides. Such a preferred device capable of moving and mixing nanoliter droplets was constructed by bonding a planar silicon substrate to channels etched in a glass cover. A series of metal heaters was inlaid on the silicon substrate as two parallel lanes merging into a single lane (a "Y"-shape) (FIG. 14a). The heating elements were formed by first coating the wafer with a 1.0 μm layer of thermal silicon dioxide. Next, 0.35 μm deep, 5 μm wide grooves were reactive-ion etched (RIE) into the silicon dioxide following the pattern set in an overlying photoresist. Aluminum was deposited (0.35 μm) across the entire wafer using electron beam evaporation and the metal layer was "lifted-off" from all surfaces having intact photoresist using a stripping solution. The metal inlay process gives a relatively planar surface and provides a uniform base for deposition of a solution-impermeable barrier layer. The barrier layer is made by a sequence of three plasma-enhanced chemical vapor depositions (PECVD): 1.0 μm silicon oxide ($SiO_x$), 0.25 μm silicon nitride ($Si_xN_y$), and 1.0 μm silicon oxide ($SiO_x$) (FIG. 14b). Some heating elements were also used as resistive temperature sensors.

Heater elements were fabricated as follows. Silicon wafer (p-type, 18–22½-cm, ⟨100⟩, boron concentration Å $10^{15}$ $cm^{-3}$) was used as a substrate for growth of $SiO_2$ thermal oxide (1 μm); photoresist (AZ-5214-E, Hoescht-Celanese) was applied and spun at 3000 rpm, 30 seconds. The resist was patterned (metal 1) and developed. Reactive ion etch (RIE, PlasmaTherm, Inc.) was performed to 0.35 μm depth into the $SiO_2$ layer at the following conditions: $CHF_3$, 15 sccm (standard cubic centimeters per minute); CF$_4$, 15 sccm; 4 mTorr; DC bias voltage of 200 V, 100 W, 20 minutes. The etch depth was measured by profilometer and 0.35 µm metallic aluminum was electron beam deposited. The resist and overlying metal was lifted off by development using Microposit 1112A remover in solution (Shipley Co.). The barrier layers consist of sequentially deposited 1 µm SiO$_x$, 0.25 µm Si$_x$N$_y$, and 1 µm SiO$_x$ using plasma-enhanced chemical vapor deposition (PECVD). RIE was used to etch contact holes to the metal layer using a second mask (CHF$_3$, 15 sccm; CF$_4$, 15 sccm; 4 mTorr; and DC bias voltage of 200 V, 100 W, 120 minutes).

Figure 14C:
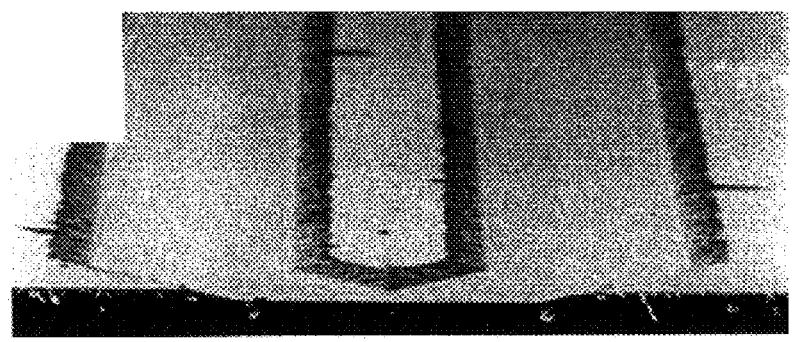
FIG. 14c is a SEM of a channel formed on glass using a wet-etch process, shown in cross section with the etched face of the wafer immediately adjacent to the intersection of two channels.

As shown in FIG. 14, the elements are arrayed as two parallel lanes, each 500 µm wide, merging into one lane. The individual heaters consist of paired aluminum wires (5 µm) winding across the 500 µm wide region. The broad metal areas on either side of the elements are bonding locations for connection to external circuitry. The width of the aluminum element is 5 µm. The channel in FIG. 14c has identical width and design configurations as the heating element lanes in FIG. 14a, and is uniformly etched 500 µm wide and approximately 20 µm deep.

The heating-element wafer was bonded to a glass wafer containing etched channels with the same "Y" format. An aqueous chemical etch of concentrated hydrofluoric acid was used to produce channels with defined side walls and uniform depth. The etched channels are defined by a chromium/gold mask and are 500 µm wide and approximately 20 µm deep. The complementary silicon heater and glass channel wafers were aligned and then bonded with adhesive to form the finished device.

Each heating element used as a temperature sensor is preferably first calibrated by measurement of electrical resistance at 22° C. and 65° C. under constant voltage; intermediate temperatures are estimated by linear interpolation.

II. Channel Treatment

Prior to performing microdroplet motion and biological reactions, the channels are preferably treated by washing with base, acid, buffer, water and a hydrophilicity-enhancing compound, followed by a relatively high concentration solution of non-specific protein. In a preferred embodiment, the channels are washed with approximately 100 µl each of the following solutions in series: 0.1N NaOH; 0.1N HCl; 10 mM Tris-HCl (pH 8.0), deionized H$_2$O, Rain-X Anti-Fog (a hydrophilicity-enhancing compound commercially available from Unelko Corp., Scottsdale, Ariz.), and 500 µg/µl bovine serum albumin (non-specific protein commercially available in restriction enzyme grade from GIBCO-BRL). The wafer was placed on a stereoscope stage (Olympus SZ1145), and the contact pads for the heating elements were connected to a regulated power supply. Heating occurred by passing approximately 30 volts through the element in short pulses and observing the movement rate of the droplets. A detectable reduction in droplet volume from evaporation was noted in each experiment, usually of less than 30%. Droplet movement was recorded with a Hamamatsu video camera on videotape.

III. Component Design

The present invention contemplates one or more gel electrophoresis modules as a component of the microscale device. Theoretical and empirical research has indicated that reducing the thickness of the electrophoresis channel leads to improved resolution. Thinner gels dissipate heat more readily and allow higher voltages to be used, with concomitant improvements in separation. The position and width of the electrophoresis detector are also critical to the ultimate resolution of the electrophoresis system. A micromachined electronic detector, such as a photodiode, placed in the underlying silicon substrate can be less than one micron from the gel matrix and can have a width of 5 microns or less. Since the gel length required for the resolution of two migrating bands is proportional to the resolution of the detector, the incorporation of micron-width electronic detectors can reduce the total gel length required for standard genotyping by at least an order of magnitude.

Figure 15A:
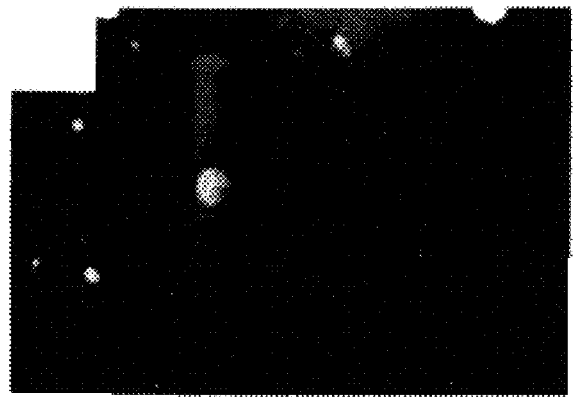
FIG. 15a is a photomicrograph of polyacrylamide gel electrophoresis in a wide etched-glass channel.

To demonstrate that standard gel electrophoresis can operate in micron-diameter channels, modules were fabricated using etched glass channels identical to FIG. 13b and fluorescent-labeled DNA (YOYO intercalating dye). Polyacrylamide gel electrophoresis of a complex DNA mixture is shown in FIG. 15a in a channel 500 µm wide and 20 µm deep. The electrophoresis was performed with the positive electrode to the right and the DNA sample applied at the left. The white vertical line is the gel-to-buffer interface. The DNA sample (BluescriptKS digested with MspI) is labeled with intercalating UV-fluorescent dye (YOYO-1) and is visualized under incandescent light. Separation of the component bands is clearly visible less than 300 µm from the buffer reservoir-to-gel interface. The high resolution of the detector (in this case, a microscope) allowed the use of an unusually short gel, resolving several closely eluting bands.

Figure 13D:
FIG. 13d shows the merging of the microdroplets to form the combined microdroplet. The open arrowheads in the figure indicate the rear meniscus and the filled arrowheads the leading meniscus for each microdroplet.

The present invention contemplates an electrophoresis unit that integrates a micromachined channel and an electronic DNA detector. The channel is constructed using a sacrificial etch process on a single silicon wafer rather than the bonded surface-etch method described earlier. In the sacrificial etch technique, the channel configuration is patterned by depositing on the wafer surface an etch-sensitive material (phosphosilicate glass, SiO$_2$.P$_x$) with a thickness equivalent to the desired channel height. A triple-layer overlay of plasma-enhanced chemical vapor deposited silicon nitride, undoped polycrystalline silicon, and silicon nitride (Si$_x$N$_y$/polySi/Si$_x$N$_y$) completely covers the sacrificial material with the exception of small access holes on the top or sides. A selective liquid etch removes the sacrificial layer material, but not the overlay or the underlying substrate. The sacrificial etch technique results in a complete channel being formed directly on the substrate containing the electronic components (FIGS. 13c and 13d). The 3 µm deep channel has two buffer reservoirs on either end with integral phosphorus-doped polycrystalline silicon electrodes. The channel height formed by this technique (~3 µm) is considerably smaller than the height of the bonded structures due to the limitations of the sacrificial layer deposition and the strength of the overlying layer. Note that, for these channel dimensions, liquid drops would have volumes on the order of picoliters.

Figure 15B:
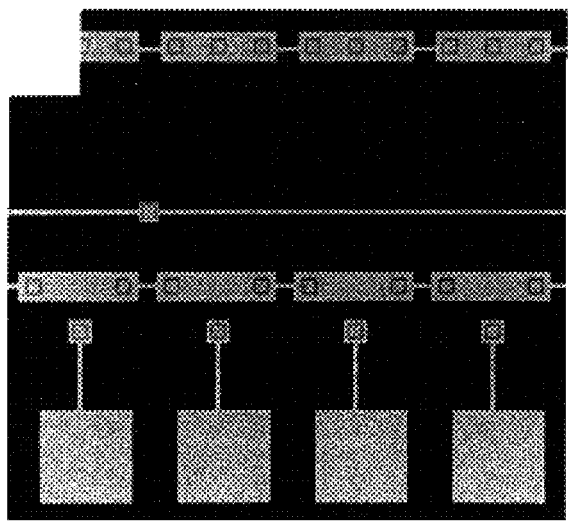
FIG. 15b is a photomicrograph of a set of four doped-diffusion diode radiation detector elements fabricated on a silicon wafer.

FIG. 15b is photomicrograph of a set of four doped-diffusion diode radiation detector elements fabricated on a silicon wafer. For each element, the three parallel dark lines define the diffusion regions of the central the detector flanked by the guard ring shielding electrodes. The diffusion regions are approximately 300 µm long and 4 µm wide.

A radiation detector, consisting of a 10 µm wide "p-n"-type diode with a 5 µm wide guard ring around the outer edge, is fashioned directly into the silicon substrate underneath the channel. In this implementation, an integral radiation detector was chosen because of (i) high sensitivity (a single decay event), (ii) small aperture dimensions, and (iii) well-know fabrication and response characteristics. On this electrophoresis system, a 1 cm long, 3 µm thick gel is able to perform as separation on a 80 and a 300 base-pair fragment of DNA. It should be noted that this diode, although currently configured for high-energy beta particle detection, can also operate as a photon detector. With proper wavelength filters and light sources, detection of fluorescence emission may be accommodated with a similar device.

Radiation detectors were prepared as follows. A 200½-cm, (100), float zone, boron-doped, p-type silicon wafer was used as a substrate. Diffused layers of phosphorus ($5\times10^{14}$ cm$^{-2}$) and boron ($1\times10^{15}$ cm$^{-2}$) were ion-implanted onto the sample in lithographically-defined regions; thermal silicon oxide was grown (0.2 μm at 900° C.) over the wafer; and contact holes were etched to the diffusion layer using buffered hydrofluoric acid solution (5:1). A 3.3 μm layer of Microposit 1400-37 photoresist was patterned to define the metal pads; 50 nm chromium followed by 400 nm gold was evaporated over the resist; and the metallization lifted off the regions retaining the resist. A layer of Microposit 1813 photoresist was applied across the wafer and baked for 110° C. for 30 minutes to form an aqueous solution barrier. Radioactive phosphorus ($^{32}$P) decay events could be detected using a sample of labeled DNA in PCR reaction buffer placed on the photoresist layer. The detector was connected to a charge-sensitive preamplifier (EV-Products 550A), followed by a linear shaping amplifier and a standard oscilloscope.

Figure 15C:
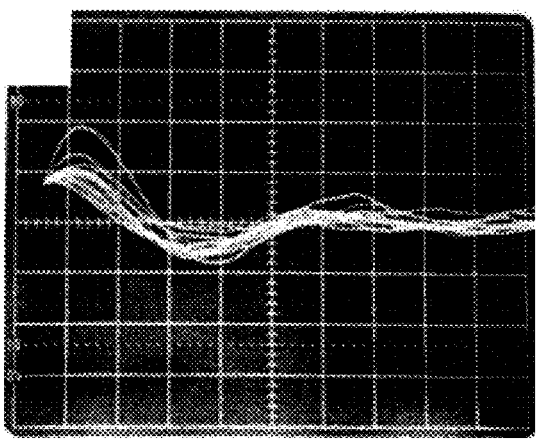
FIG. 15c is an oscilloscope trace of output from the radiation detector showing individual decay events from $^{32}$P-labeled DNA.
Figure 16A:
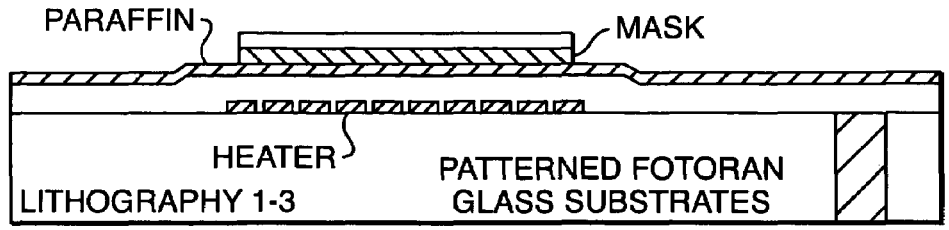
FIG. 16 shows an example of the fabrication flowsheet for a thermopneumatic valve.
Figure 16B:
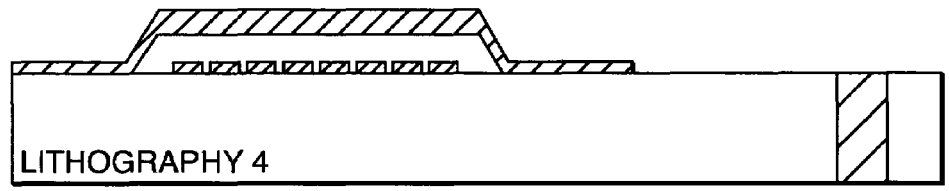
Figure 16C:
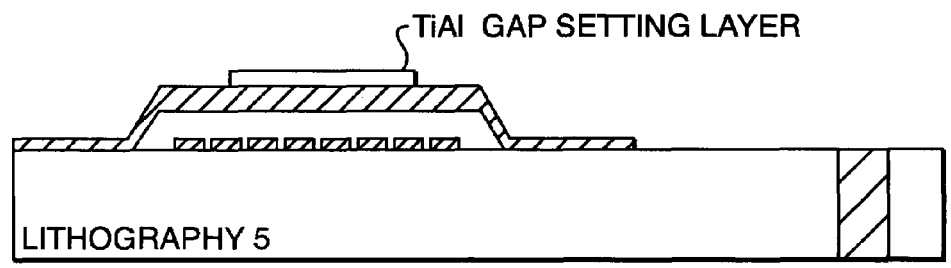
Figure 16D:
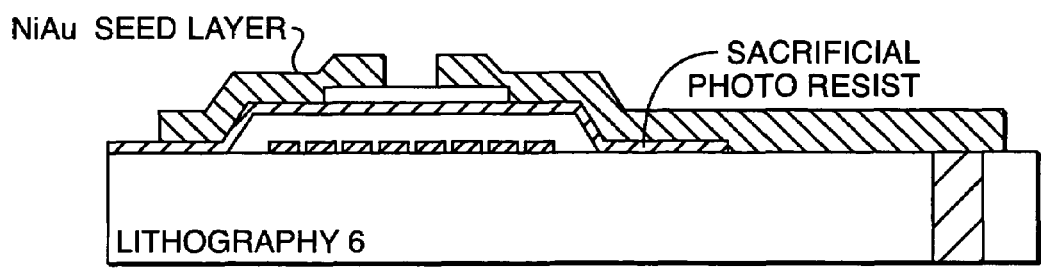
Figure 16E:
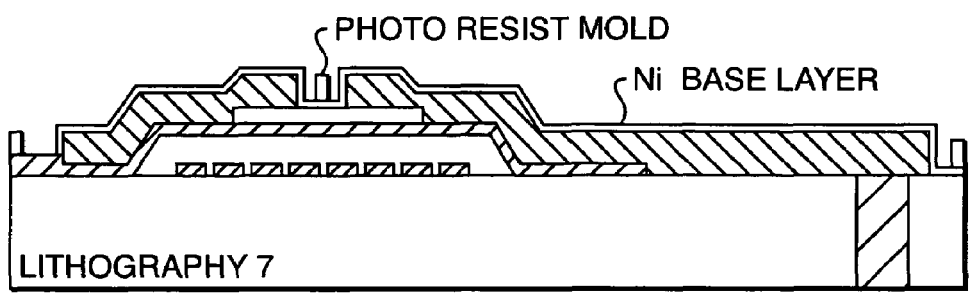
Figure 16F:
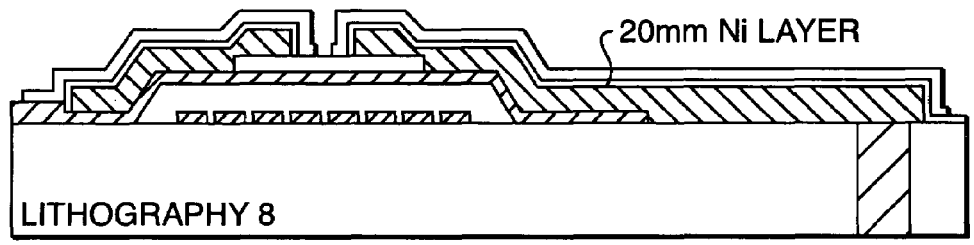
Figure 16G:
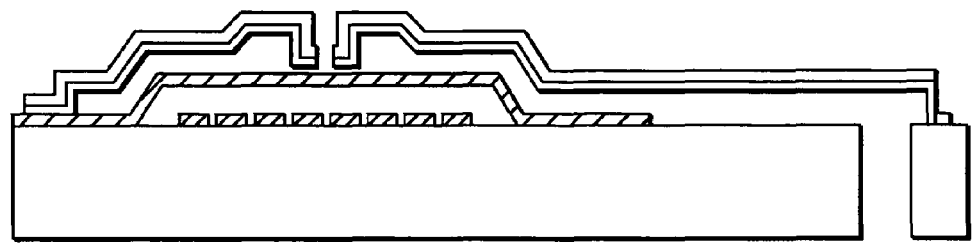

FIG. 15c shows an oscilloscope trace of output from the radiation detector showing individual decay events from $^{32}$P-labeled DNA. The aqueous DNA sample was placed directly on the detector and sampled for 30 seconds. The screen is displaying a vertical scale of 0.5 V/division and horizontal scale of 20 μsec/division.

IV. Phase Change Latch Valve Design

Microfluidics (Whitesides, G. W. and Stroock, A. D., Physics Today, 54:42–48, 2001; Mitchell, P., Biotechnology, 19, 717–721, 2001) holds the key to the integration of system level advances in on-chip sample preparation, reaction and separation onto a single device. A microfluidic system that will interface all the individual components on a single chip without increasing the existing complexity will be invaluable. The two microfluidic components that are essential for realizing fluidic manipuation on an integrated device are the micropumps and microvalves. Microvalves are primarily used to manipulate flow along a specified path on the microchip or seal a section of the chip (Jakeway, S. C., et al., Fresenius J. Anal. Chem., 366:525–539, 2000). They are often used in conjunction with a pumping mechanism and also provide check valves for micropumps (Carrozza, M. C., et al., Matter Sci. Eng., C5:177–179, 1995). They have also been used for on-chip metering of reagent volumes (Handique, K., et al., Anal. Chem., 72:4100–4109, 2000). Khandurina, J., et al., (Anal. Chem., 71:1815–1819, 1999) have used a porous polysilicate membrane in a channel as a valve to concentrate DNA samples. Encapsulating chemicals in a reservoir with a gold film to form a microdelivery system is another example of unconventional valving application (Santini, J. T., et al., Nature, 397:335–338, 1999).

The microvalve family can be divided into active (those that have an actuator assembly) and passive valves (those that do not have an actuator, e.g., check valves) (Shoji, et al., (eds.) Microsystem Technology in Chemistry and Life Sciences, Springer, London, pp 161–188, 1998). Most of the active valves developed involve a deflecting membrane (valve seat pinned along the entire circumference) or a deflecting cantilever (Koch, M., et al., Sens. Actuators A. Phys., 70:98–103, 1998) (valve seat partially pinned). The deflection of the membrane or the cantilever can be obtained by an actuation mechanism that could be piezoelectric, electrostatic, electromagnetic, thermopneumatic, bimetallic or shape memory alloy (Shoji, S. and Esashi, M., J. Micromech. Microeng, 4:157–171, 1994). Though easy to visualize, owing to their widespread use at the macroscale, these suffer from certain inherent disadvantages. The force generated by the micromachined actuators is small. This, coupled with the stiffness of the membrane (100 Gpa), leads to very small deflections of the membrane (around 10 microns maximum) Surface roughness and friction of metallic membranes are further complications that need to be addressed, as is the adhesion of different layers (Unger, M. A., et al., Science, 288:113–116, 2000). Moreover the actuation requires very high power as the force scales adversely with size (Liu, R. H., et al., J. Microelectromech. Syst., 11:45–53, 2002). These valves are, in general, plagued by complex fabrication procedures. A typical valve will take as many as 8 photolithographic steps (FIG. 16) (Carlen, E. T. and Mastrangelo, C. H., IEEE MEMS 2000 Conference, Miyazaki, Japan, 381–385, 2000).

Soft lithography has been used as an alternative to metallic membranes (Unger, M. A., et al., Science, 288:113–116, 2000). Though these give higher deflections leakage is still a big problem. The main reason for leakage is the nonconformity of the channel shape and the shape of the valve seat. Most of the channels are either rectangular or trapezoidal in shape that is hard for a deflecting membrane to completely block. Matching the shape of the channel and the valve within tight tolerance is an important issue to prevent leakage.

Figure 17A:
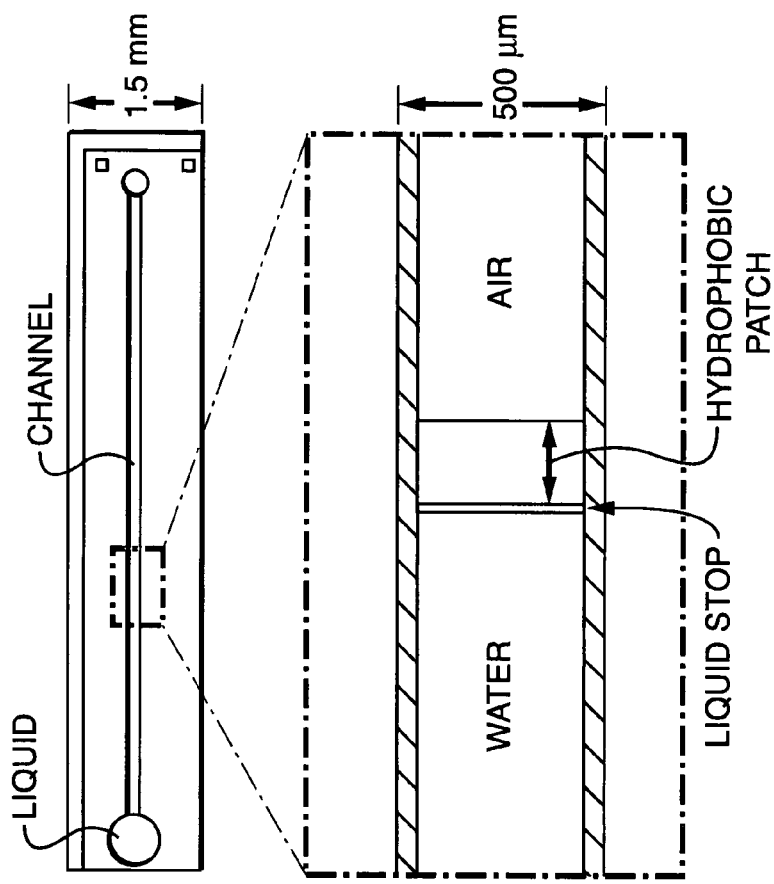
FIG. 17 shows microvalves: a) an example of a stop valve; b) an example of a check valve.

Another common class of valves involves surface patterning regions on the chip. A hydrophobic patch on a chip could be used as a stop valve (FIG. 17a) for capillary motion (Handique, et al., Anal. Chem., 72:4100–4109, 2000; Anderson, et al., Sens Actuators B. Chem., 75(1–2), 136–141, 2001). The channel geometry could also be modified to tailor channel resistances and these structural valves could then be used for sequential injection of samples (Perez-Castillejos, R., et al., MicroTAS, 492–494, 2001). Though these are the only valves incorporated on an integrated device (Burns, M. A., et al., Science, 282:484–487, 2001; Anderson, H., et al., Electrophoresis, 22:249, 2001) they cannot be used for sealing and will fail if subjected to pressure fluctuations.

A different approach involves valves in which the valve seat and the actuation mechanism are coupled into one unit. Not only does this simplify the valve operation but this unit can also be made to exactly conform to the channel geometry. Examples of these valves are the hydrogel valves (Yu, Q., et al., Applied Physics Letters, 78:2589–2591), in-situ polymerization valve (Rehm, J. E., et al., MicroTAS, 2270229, 2000) and freeze/thaw microvalve (Tan, H. and Yeung, E. S., Anal. Chem., 70: 4044–4053).

Figure 17B:
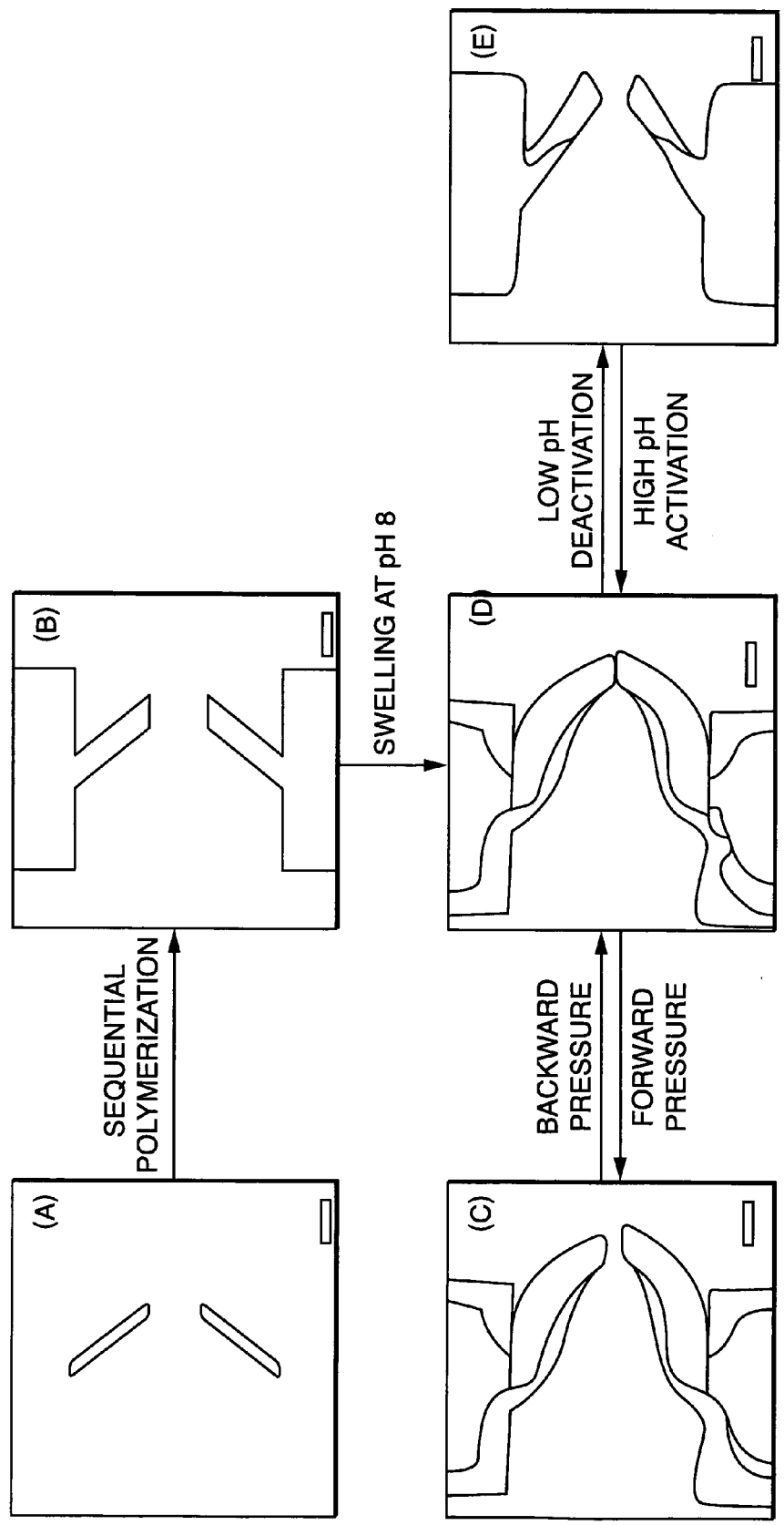

Polymerizing a liquid monomeric solution at specific locations on the chip makes the hydrogel and the in-situ polymerization valve. Hydrogel valves (FIG. 17b) that swell in response to pH have been used as flappable check valves while the polymeric "pistons" coupled with external air pressure/vacuum have been used to form nanoliter pipettes as well as one-way valves. A freeze/thaw valve involves freezing a small plug of liquid in a channel to stop flow and subsequently thawing it to resume normal operation. Like most valves, these valves can be either normally closed or normally open with continuous energy being required to keep the valve in the non-default configuration. A valve that is both normally open and normally closed with energy being required to only change the state of the valve is invaluable. Moreover, this latching valve should conform to the channel shape like a liquid and yet once actuated it should form a rigid seal against back pressure. Additionally, for the valve to be used on the integrated device the fabrication procedure should add few (preferably 0) steps to the existing photolithographic fabrication steps. A valve meeting all these requirements is the "Phase Change Latch Valve".

Figure 18A:
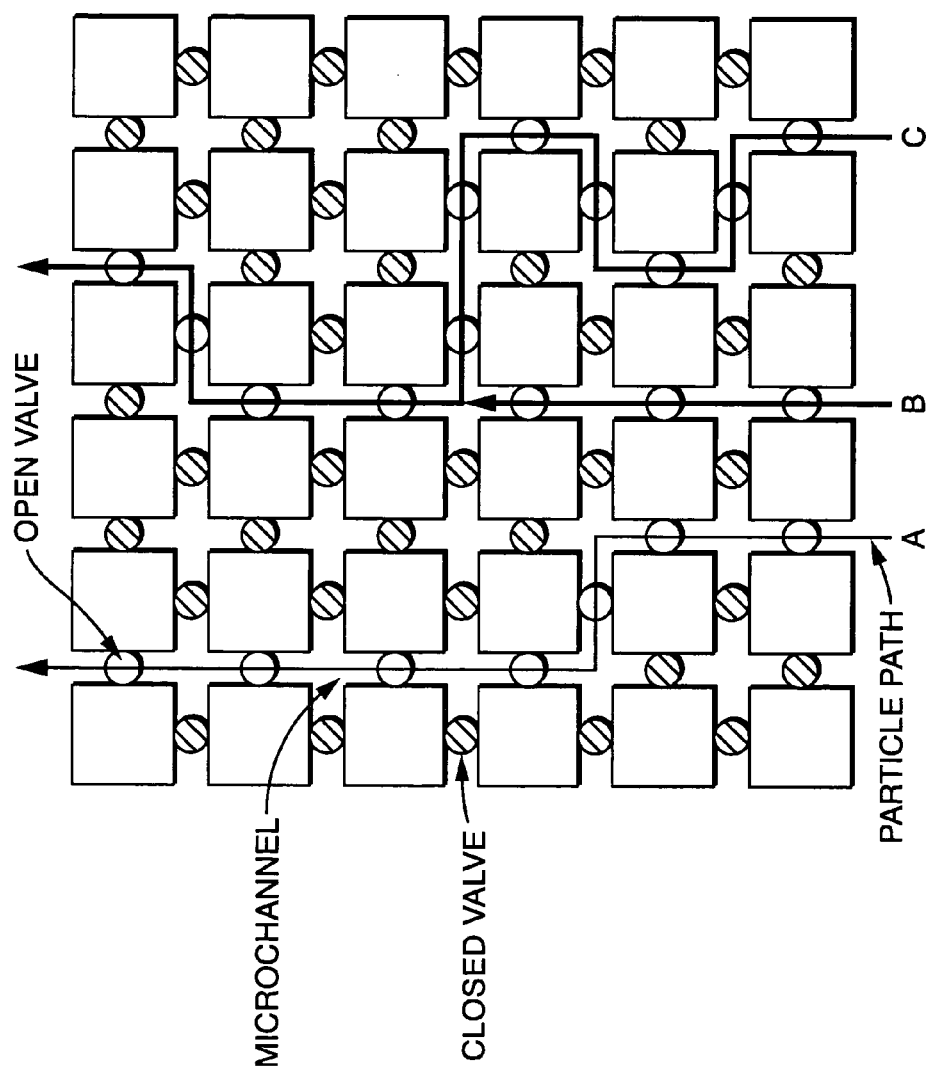
FIG. 18 shows a microvalve array: a) using soft lithography and; b) using electrostatic microvalves.
Figure 18B:
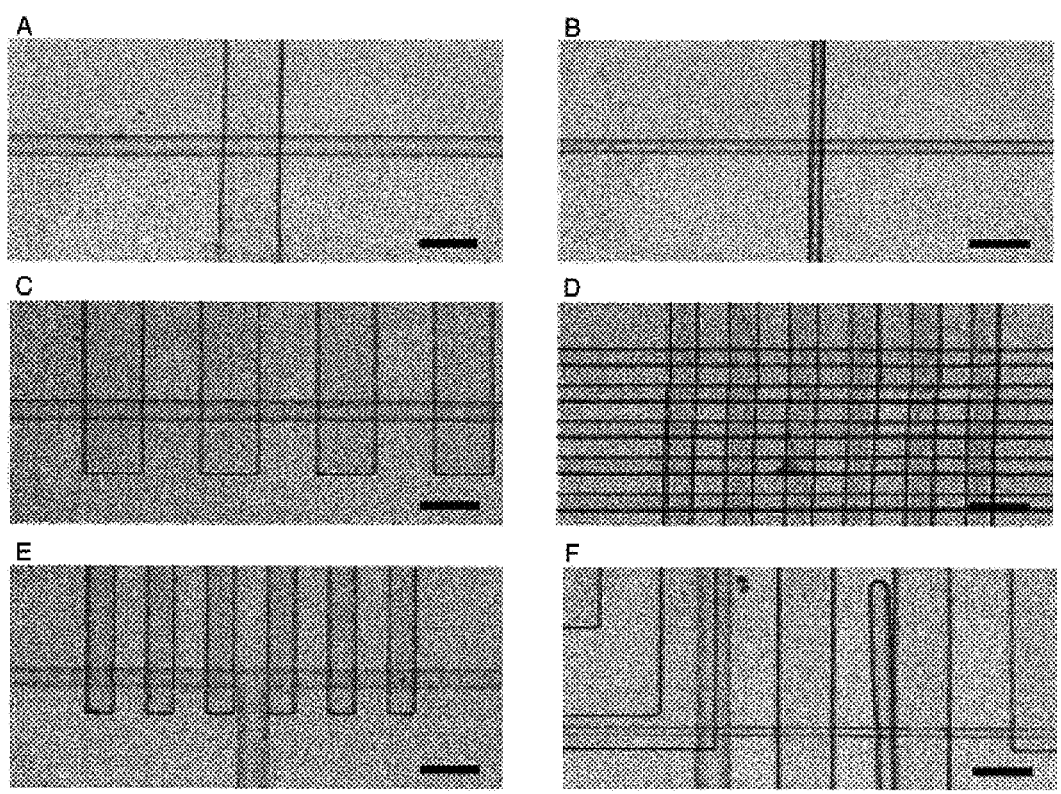

Phase change latch valves work on the principle of reversible phase transition of a material in response to a stimulus (e.g., wax, electrorheological fluids, swellable colloidal solutions, etc.). Though the valve was developed for wax with heat as the stimulus the general principle could be extended to a number of compound/stimuli. Wax is molten at temperatures above the melting point and conforms exactly to the channel shape. It can be easily moved around using external pressure, on-chip thermopneumatic pressure (Jandique, K., et al., Anal. Chem., 73:1831–1838, 2001) or themocapillary motion (Sammarco, T. S. and Burns, M. A., AIChE J., 45:350–366, 1999). Once moved to a region where the temperature is lower than the melting point, it will solidify to form a solid plug. Temperature gradients to perform this operation can easily be set up using on-chip heaters. Moreover energy (heat) can be localized to a small region to develop an array of individually addressable valves. Typically an integrated device would require not one but several valves actuating at different times. The microvalve array (FIG. 18) could be used for flow control, directing flow or realizing a sequential or parallel series of operations.

Vandelli, et al., (J. Microelectromech. Syst., 7:395–403, 1998) have realized a parallel array of electrostatic valves working cooperatively to achieve precision flow at macroscopic scale. Baechi, et al., (Baechi, D., et al., Sens. Actuators A. Phys., 95:77–83, 2002) have integrated a microchannel network with an array of thermopneumatic valves, cooling channels and photodiodes for parallel processing of nanoparticles. They have achieved a valve density of 330 valves per $cm^2$. However, due to the complexity of the individual unit, these arrays are not ideal for use on an integrated device.

Experimental

The following examples serve to illustrate certain preferred embodiments and aspects of the present invention and are not to be construed as limiting the scope thereof.

In the experimental disclosure which follows, the following abbreviations apply: eq (equivalents); M (Molar); µM (micromolar); N (Normal); mol (moles); mmol (millimoles); µmol (micromoles); nmol (nanomoles); gm (grams); mg (milligrams); µg (micrograms); L (liters); ml (milliliters); µl (microliters); cm (centimeters); mm (millimeters); µm (micrometers); nm (nanometers); ° C. (degrees Centigrade); Ci (Curies); MW (molecular weight); OD (optical density); EDTA (ethylenediamine-tetracetic acid); PAGE (polyacrylamide gel electrophoresis); UV (ultraviolet); V (volts); W (watts); mA (milliamps); bp (base pair); CPM (counts per minute).

Examples demonstrating the construction and use of microfabricated devices are given in U.S. Pat. No. 7,048,734 to Burns and said Patent is herein incorporated by reference.

EXAMPLE 1

In this example, a microdevice is fabricated as per U.S. Pat. No. 7,048,734 to Burns et al. and which is herein incorporated by reference. The test structure is very simple. The main part is constructed from a two mask process with five layers of materials on top of the Si substrate. Proceeding from the lowest to the uppermost layer, the $SiO_2$ serves as an insulator between the Si substrate and the other metal layers, which function as solder pads and heating elements. The Ti layer (250 Å) is for adhesion of Ni. The layers of Ni (1000 Å) and Au (1000 Å) act as a diffusion barrier for the solder. The Au layer also serves as a wettable pad. Finally, the layer of solder is for bonding two substrates together. The solder will melt by heating the metal layers. Another substrate that will be bonded has the same construction except for the solder.

A thermo-pneumatic microvalve is utilized in the test structure. A corrugated diaphragm is chosen for its larger deflection and higher sensitivity. The diaphragm (side length=1000 µm, thickness=3 µm, boss size length=500 µm, and boss thickness=10 µm) has a deflection of 27 µm at an applied pressure of 1 atm. This applied pressure is generated by a thermo-pneumatic mechanism, which provides a greater actuation force. A pressure of 1 atm is generated in the cavity between the diaphragm and glass by Freon-11 when it is heated 11° C. above room temperature. Ten masks are anticipated to fabricate the microvalve.

A portion of a silicon substrate is a p-type (100)-oriented Si wafer of normal thickness and moderate doping (>1 cm). The preferred wafer thickness, however, is ordinarily a function of the wafer diameter. The upper surface of the silicon wafer containing substrate is lapped, polished and cleaned in the normal and accepted manner. Isotropic etching using reactive ion etching (RIE) forms the diaphragm corrugations with photoresist as the masking material.

Deep boron diffusion areas are used to form the rims, center bosses, inlet and outlet holes of the finished device. The various metal layers, including solder, are then deposited. The deep and shallow boron diffusion processes define the shape of the diaphragm and the etch-stop for the dissolved wafer process.

Following this, the definition of oxide layer serves as insulator of the solder of the finished device. Ti adhesion/Ni/Au barrier and wettable pads are then deposited. The solder mold of Ni and photoresist is then defined and the first Ni channel is created by surface-micromachined using photoresist as sacrificial layers. The Ni channel hole is defined using EDP to remove the sacrificial layers, and define an channel hole.

A second Ni channel is defined by Ni and photoresist, and the inlet and outlet holes are defined using EDP to remove the sacrificial layers.

Lastly, a Ti/Pt heater in glass is anodically bonded to the silicon substrate. Freon-11 fills the cavity through a hole in the glass substrate. This hole is created with a diamond drill bit and sealed with epoxy.

Within this device, phase change latch valves were constructed as detailed below.

EXAMPLE 2

Design of the Microfluidic Phase Transition Latch Valve. The Primary objective of this work was to construct a microvalve network that would replace external valving for fluidic manipulation on the integrated device. Central for realizing complex fluid motion is an easy-to-fabricate microvalve. For discrete drop systems flow regulation is generally not a concern. An on-off valve to selectively open or close lines would suffice for most of the fluidic manipulation on an integrated system. It is very important that the valve be designed for efficient functioning of the integrated device. The success of the valve was measured against the efficient performance of the integrated device. The single unit valve is compatible with the biochemistry. The valve should introduce few (preferably zero) additional steps to the photolithographic fabrication strategy for integrated devices. Additionally, the valve is electronically addressable. Finally, in order to have a complex network the individual valve is fairly robust.

A phase transition latch valve having the desired characteristics was designed, constructed and characterized. In addition to the above-mentioned characteristics the phase transition latch valve can be used in a normally open or normally closed state and requires energy only for transition between states.

Although the present invention is not limited to any particular theory, the basic principle of the valve is the phase change from solid to liquid of any material (for example, wax) with temperature. We are able to establish temperature gradients on the chip therefore it is possible for a wax plug to exist in the liquid state on one part of the chip and solid on another part of the chip at the same instant.

Figure 19:
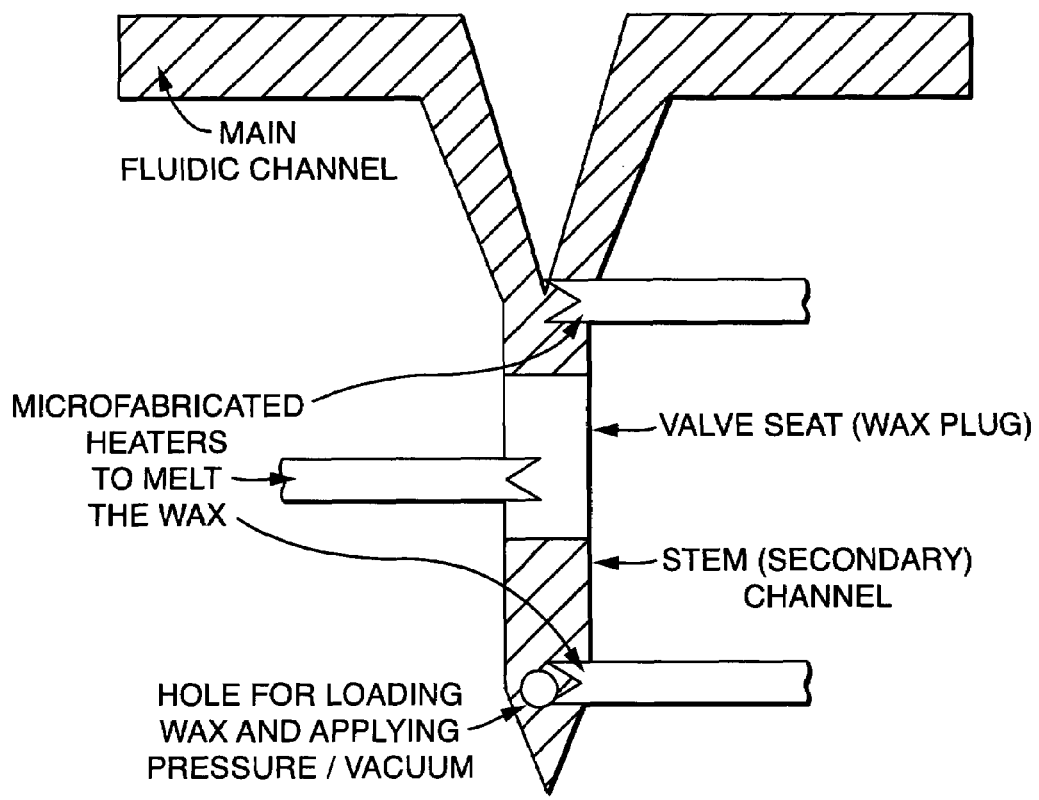
FIG. 19 shows a generic design of a phase change latch microvalve.
Figure 20:
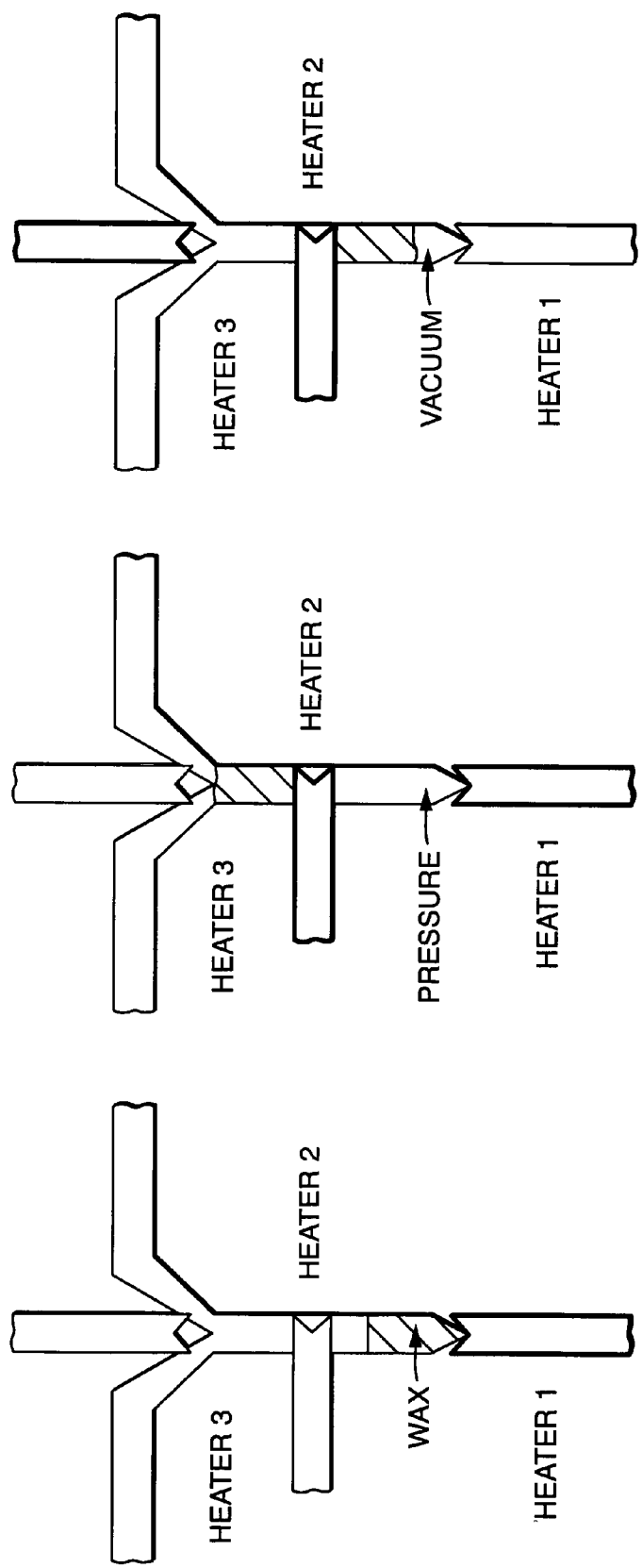
FIG. 20 shows the working of the wax valve: a) shows loading the wax by firing heater 1; b) shows the closing of the valve by moving the wax forward by firing heaters 1 and 2 and applying pressure at the inlet port; and c) shows the opening of the valve by pulling the wax back by firing heaters 2 and 3 and applying vacuum at the inlet port.

As seen from FIG. 19, the generic model of this valve has an inlet port or a "stem" channel which is connected to the main channel at an intersection. The intersection can have different configurations (for example, it can have a "T" or "Y" configuration) for better performance of the valve. The heaters are strategically placed at the three locations in the valve setup. The operation of the valve involves three main steps (see, FIG. 20). One, loading wax in the stem channel; two, moving the wax into the intersection to block of the main channel (i.e., closing the valve) and, three, then pulling the wax back into the stem channel away from the intersection to open the main channel (i.e., opening the valve).

EXAMPLE 3

This example examined the properties of several different waxes for use in the valves of the present invention.

The viscosity of wax was measured as a function of temperature on a constant stress rheometer. The oscillation mode on a cone and plate rheometer was used. The oscillation frequency was set to 6.283 rad/s while the geometry gap was set to 44 microns. All pure waxes showed a sharp transition from liquid to solid at the melting point. Wax mixtures were used to tailor melting points. Wax mixture 2 was a blend of 50% paraffin wax (melting point=49° C.) and 50% M1595 synthetic wax (melting point=85° C.). Upon cooling, this mixture showed a sharp transition around 79–81° C. and then the viscosity gradually increased to the solid phase value till 49° C. which is the melting point of the paraffin wax. Wax mixture 1 which has 25% paraffin and 75% M1595 had a transition around 72–75° C.

Figure 21:
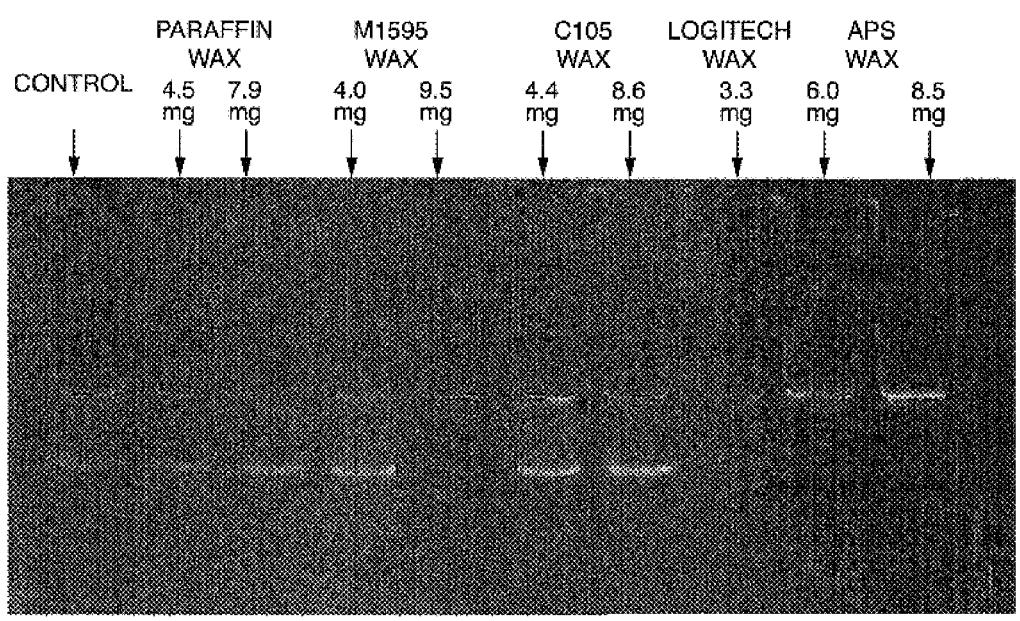
FIG. 21 shows the results for off-chip Snrpn PCR carried out in the presence of different waxes to check them for biocompatibility.

The biocompatibility of the waxes for use in lab-on-a-chip application was tested by performing off-chip PCR in presence of the wax. This was a 25 mL Snerpn polymerase chain reaction (PCR). The PCR mixture had 1 mL of Taq enzyme (5 units/ml) and 1 ml of template (20 ng/ml). The product of the reaction was tested on the conventional slab gel. The PCR reaction was not effected by paraffin wax, M1595 synthetic wax and C105 synthetic wax (FIG. 21). All these either in the pure state or in conjunction with each other are ideal candidates for a biocompatible wax valve.

EXAMPLE 4

Loading wax into the stem channel (see, FIG. 20a). First, the inlet port heater is heated and an adequate amount of wax (solid at the ambient temperature) is placed over it. The wax melts and is drawn into the channel by capillary forces. However, there is a decreasing spatial temperature gradient in the direction the wax is moving. The molten wax encountered a front with a temperature lower than its melting point and the advancing edge solidifies. Thus, different amounts of wax can be loaded into the stem channel by firing the inlet port heater to different temperatures. Once the wax was loaded moving the wax plug to the intersection would actuate the valve.

The phase transition latch valve was closed as follows (see, FIG. 20b). An energy pulse is sent to the inlet port heater and the stem channel heater with positive air pressure being applied at the inlet port. The wax melted and as the viscosity changed to a much lower value, in the liquid phase, it moved forward. This advancing molten plug was stopped in one of two ways. One, it encountered a cold front because of spatial gradients on the chip or, two, the energy pulse to the heated ended so that the whole chip cooled, i.e., a temporal gradient was established. A solid plug was formed right at the intersection where it blocked the main fluidic channel. Note that no energy was needed to keep the valve in the closed position unlike conventional valves.

EXAMPLE 5

Opening the phase transition latch valve (see, FIG. 20c). To open the valve the intersection heater and the stem channel heater received an energy pulse (e.g., heat) and negative air pressure was applied at the inlet port. The molten wax was then retracted into the stem channel and stopped by the spatial or the temporal gradient as above. Once the valve was open again no energy was needed for the valve to be in the open state. One of the advantages to the present invention is that the valve can be used either as a normally open or a normally closed valve. This allows intricate fluidic manipulations in microfabricated devices to finally be realized.

EXAMPLE 6

Figure 22:
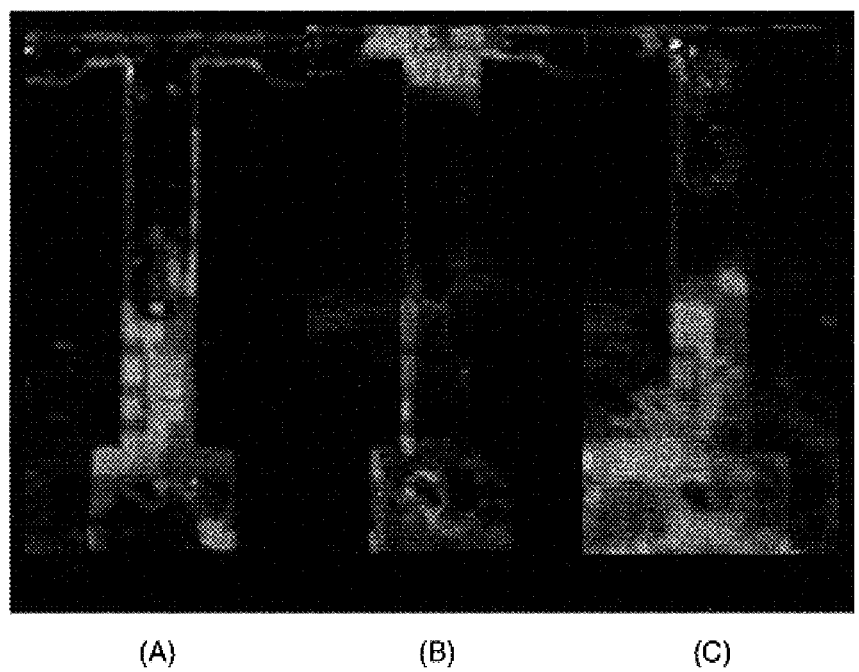
FIG. 22 shows the operation of the wax valve using parafin wax in the "T" shaped valve: a) loading; b) closing; c) opening valve.

Characterization of the valve operation. FIG. 22 shows a typical operation (loading, closing and opening) of the wax valve using paraffin wax. The wax was loaded by firing the inlet port heater to 10 V with the cold chuck set to 10° C. The valve was closed by applying 11.3 V to the inlet port heater and stem channel heater 1. The pressure at the inlet port was about 13 inches of water. The valve was opened by applying 10 V to the intersection heater and stem channel heater 2. The aspirator was used to provide the necessary vacuum at the inlet port. For these initial runs once a solid interface was formed the pressure/vacuum was discontinued and heaters were turned off manually.

The chip was put in an oven for calibration and the temperature was monitored by a thermocouple placed inside the oven. The setting of the oven was changed and temperature allowed to stabilize. The four-point reading was taken at every temperature.

Figure 23:
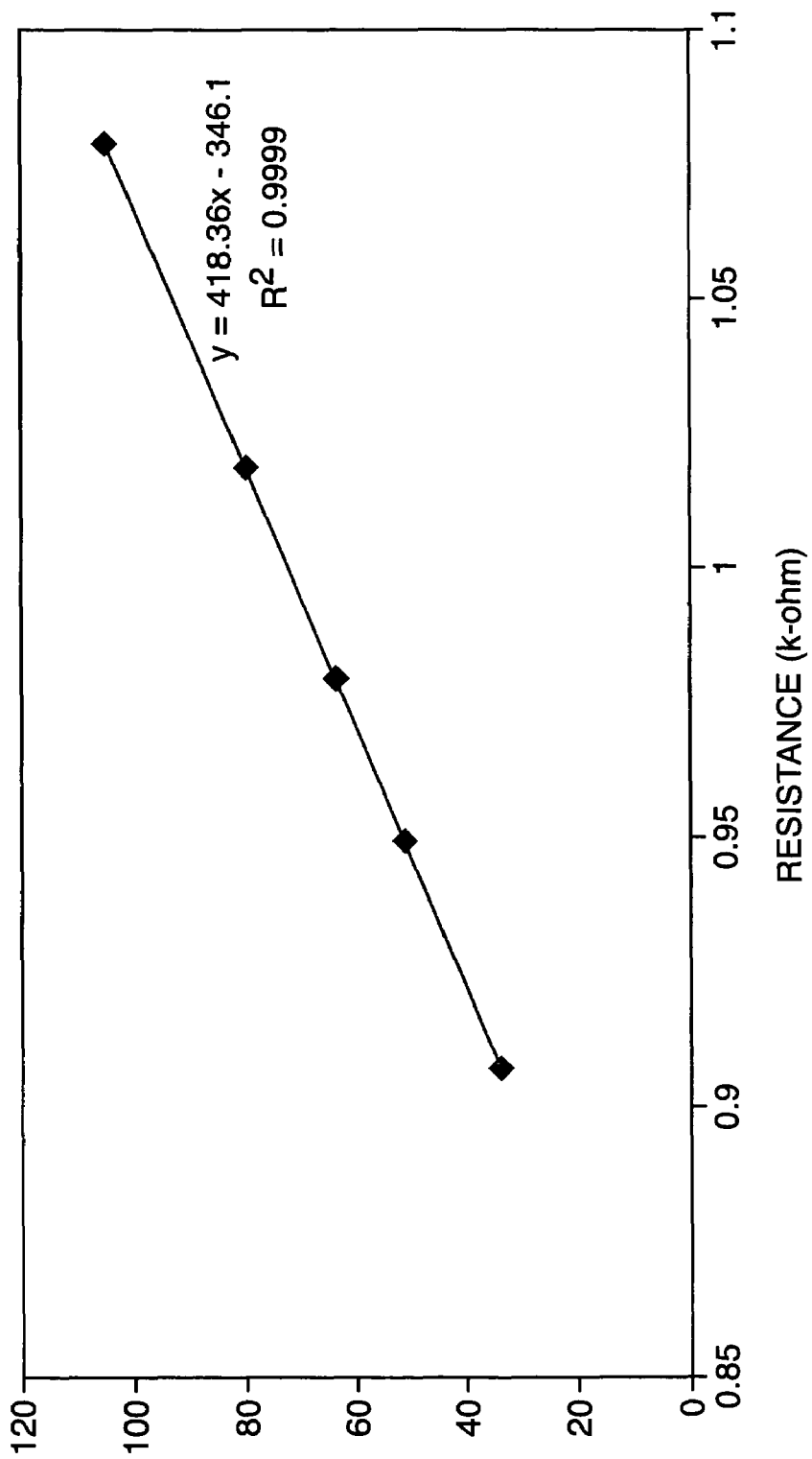
FIG. 23 shows a typical calibration curve obtained for on chip temperature sensors. The four point calibration method was used for the measurements.
Figure 24:
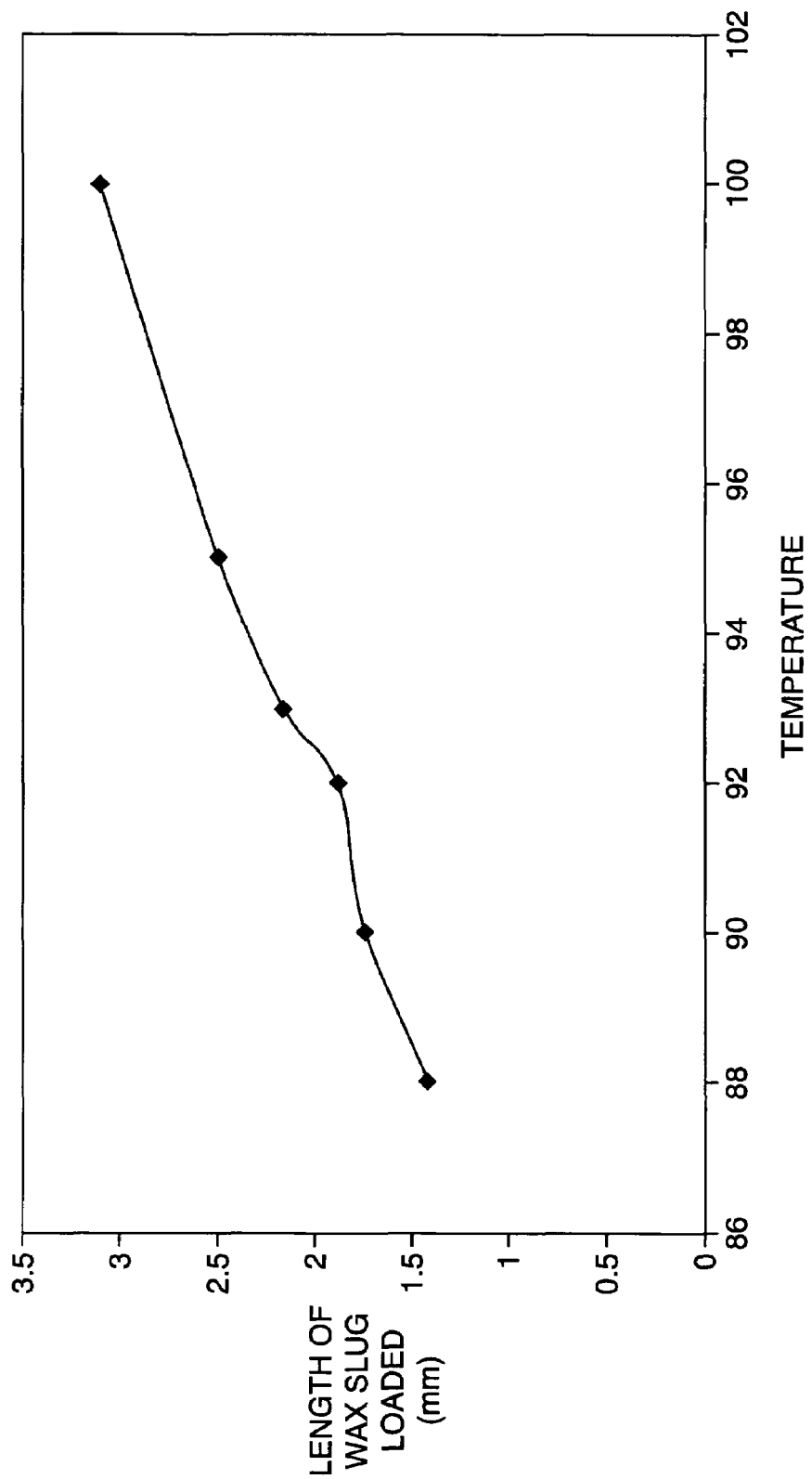
FIG. 24 shows the temperature vs. amount of M1595 wax loaded in the stem channel.

Next, M1595 synthetic wax was used as it has a higher melting point that is compatible with the temperatures encountered on genotyping and sequencing chips. For loading wax, a blob of wax was placed at the inlet port and inlet port heater was fired to different temperatures. The temperatures were controlled using the PI control module in LABVIEW™. A calibration curve is shown in FIG. 23. The bottom of the chip was initially at 16° C., obtained by setting the cold chuck to 10° C. By firing the heater to different temperatures different lengths of wax slug could be loaded into the stem channel (FIG. 24).

Figure 25:
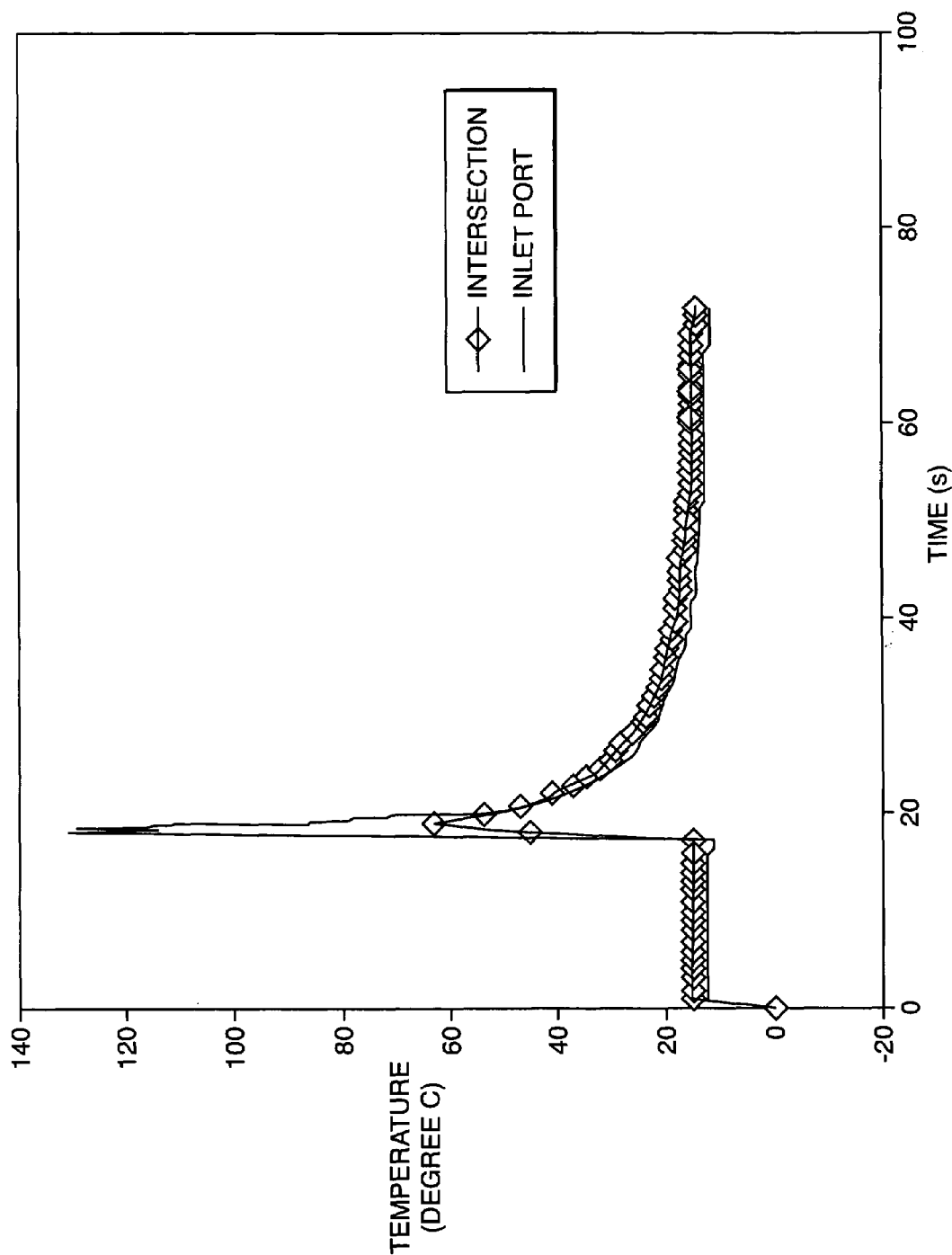
FIG. 25 shows temperature responses at the inlet port and intersection for a 24 V, 1.5 s pulse on the inlet port and stem channel heaters.
Figure 26A:
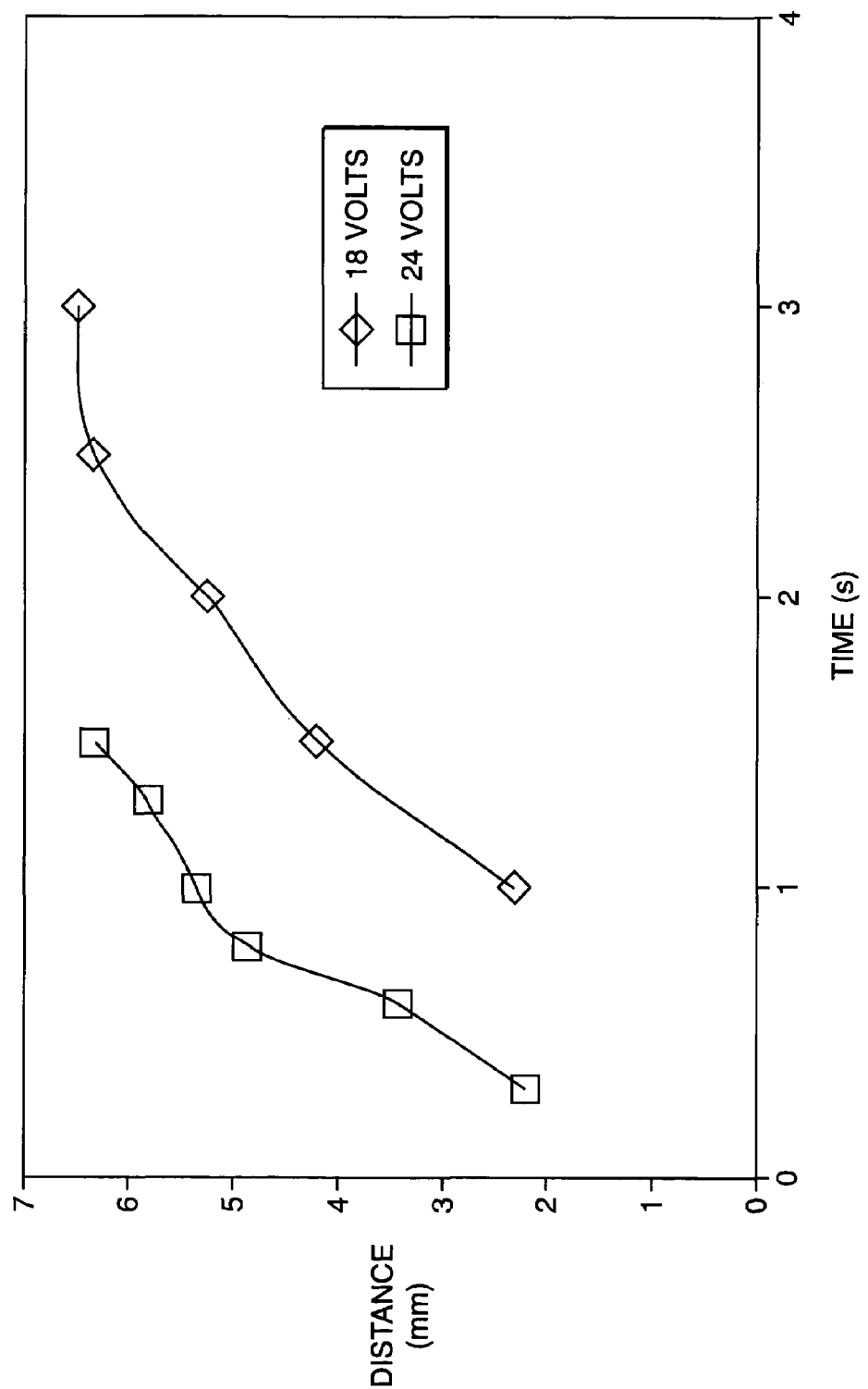
FIG. 26 shows a) the position of the solid interface as a function of the energy pulse characteristics. The channels had a width of 700 μm and a depth of 50 μm. The length of the initial slug of wax was 2 mm; b) shows the repeatability test of wax movement.
Figure 26B:
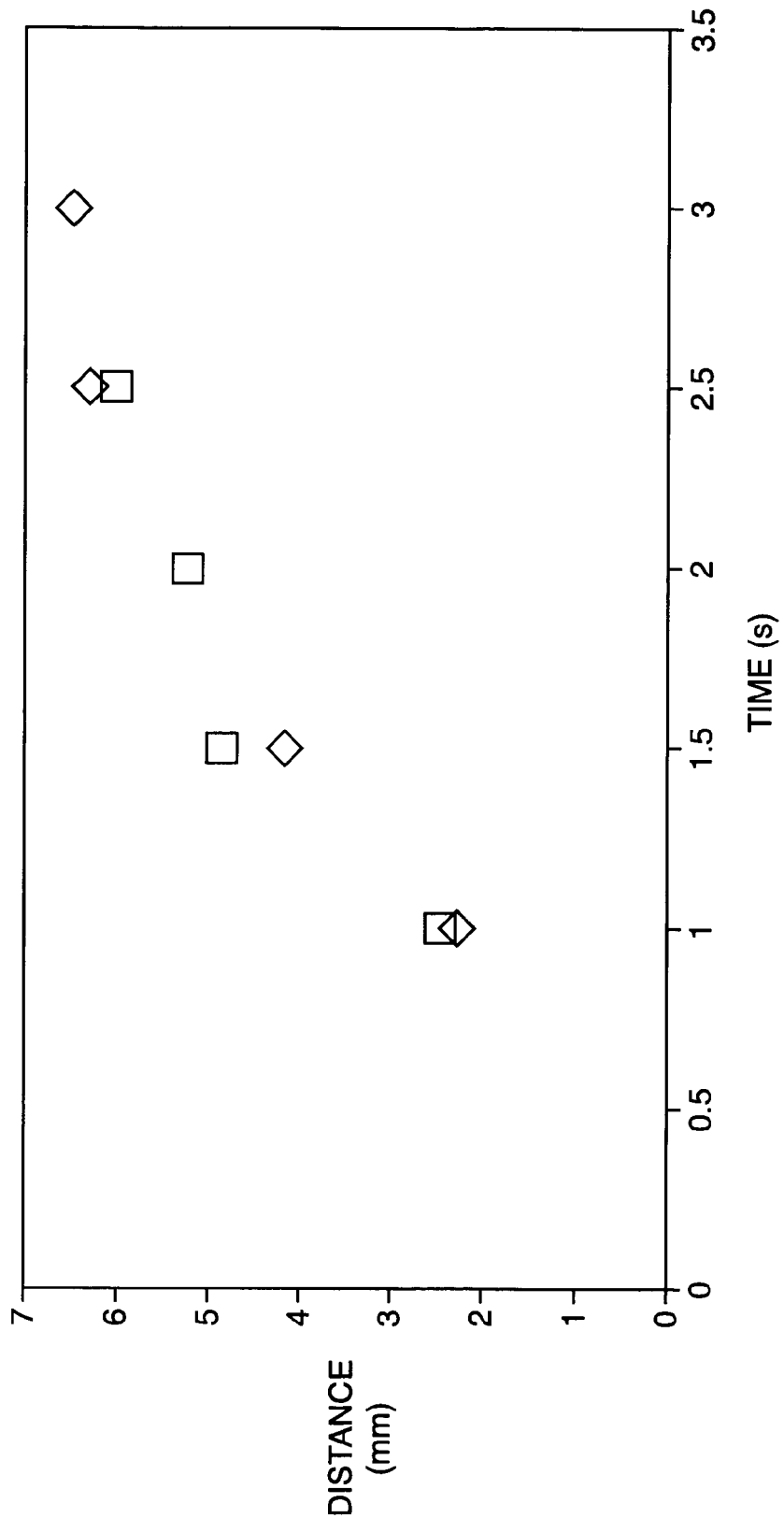

For closing the valve a pulse of energy was given to the inlet port and stem channel heaters. This would melt the wax and establish a gradient along the stem channel to move the slug to the desired point. This was done by putting out a high voltage across the heaters, for a specified time. All this was controlled by using relay signals from LABVIEW. A typical temperature response at the inlet port and the valve intersection for a high energy pulse is shown in FIG. 25. The closing of the valve was characterized by loading a definite amount of wax and moving it in the stem channel. The independent variable for these runs was the energy pulse intensity (voltage) and the pulse duration. For these runs the cold chuck was maintained at 10° C. and a pressure of 15 inches of water was applied at the inlet port. The position where the solid interface was formed relative to the base of the valve was noted (FIG. 26a). The experiments were repeated for the 18 V signal intensity and as seen from FIG. 26b the results are reproducible.

For smooth opening of the valve the intersection needs to be patterned with an appropriate surface coating to repel the wax. Such a coating can be determined by measuring the contact angle of wax on that surface. The greater the value of the angle the better is the coating. As seen from Table 3.1, the silane treatment, or other silicone-based treatment, is a good candidate for a wax repellant surface.

EXAMPLE 7

Figure 27:
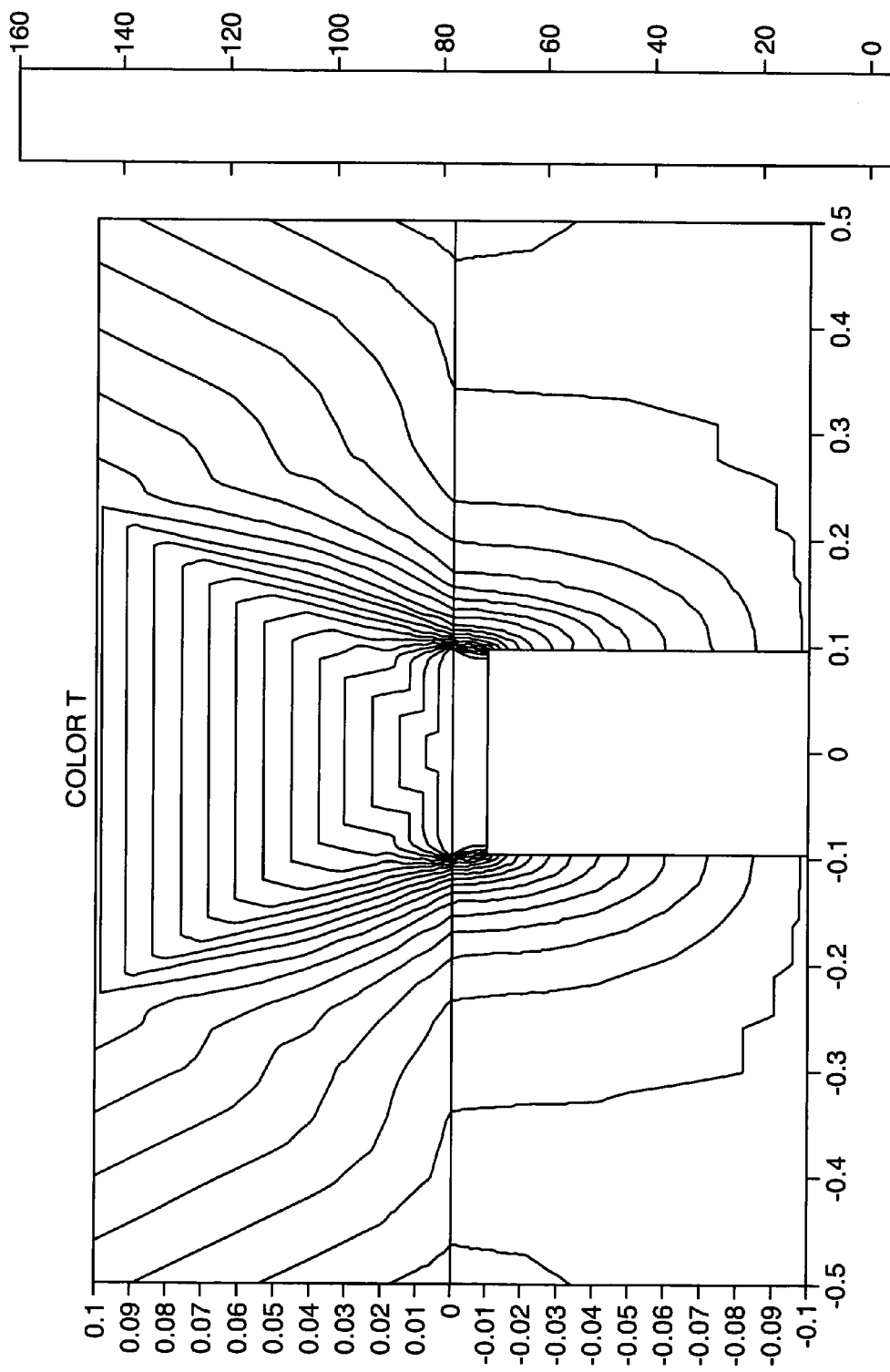
FIG. 27 shows a simulation comparison of the effect on temperature gradients by back etching into the silicon. The top part of the device is glass and bottom surface is assumed to be at 10° C. and free convection to the air at 20° C. is assumed for all other surfaces.

Microvalve Array. For having a high valve density in a valving network it is important that the heat effects of one valve are confined to the smallest possible area. One way of doing this is by using a suspended heater configuration where the Silicon under the heater is etched away. The simulation using PDETOOL™ (Partial Differential Equation Toolbox) module of MATLAB™ (Natick, Mass.) show that indeed much steeper temperature gradients can be obtained by using suspended heaters (FIG. 27).

As can be seen by the forgoing, the present invention provides for devices and methods for the improvement in the design, production and use of valves in microscale devices and, in particular, the movement and control of liquids through microscale devices utilizing the improved valving devices and methodologies of the present invention.

The invention claimed is:

1. A method, comprising:
   a) providing, a device, comprising,
      i) a meltable material;
      ii) an inlet port linked to a gas source, wherein said inlet port is associated with a first heater element;
      iii) a stem microchannel comprising a second heater element, wherein said stem microchannel is in fluidic communication with said inlet port;
      iv) a main microchannel intersecting said stem microchannel, said main microchannel comprising a third heater element, wherein said intersecting forms a junction;
   b) firing said first heater element to load said meltable material into said stem microchannel through said inlet port;
   c) firing at least two of said heater elements under conditions such that said meltable material at least partially melts to create a melted plug; and
   d) applying pressure with said gas source under conditions such that said melted plug is moved.

2. The method of claim 1, wherein said junction is configured as a "T" junction.

3. The method of claim 1, wherein said junction is configured as a "Y" junction.

4. The method of claim 1, wherein said meltable material is selected from a group consisting of solder, plastic, polymer, electrorheological fluid and wax.

5. The method of claim 1, wherein said substrate is selected from the group consisting of glass and silicon.

6. The method of claim 1, wherein said firing of at least two of said heater elements comprise said second and third heater elements.

7. The method of claim 1, wherein said applying of said gas source comprises a vacuum source, thereby retracting said melted plug out of said junction.

8. The method of claim 1, wherein said stem microchannel and said main microchannel are disposed in a substrate.

9. The method of claim 1, wherein said firing of at least two of said heater elements comprise said first and second heater elements and said applying pressure of said gas source comprises generating a positive pressure, thereby moving said melted plug into said junction.

10. The method of claim 9, wherein said pressure source is an air source.

11. The method of claim 9, wherein after said melted material moves to said junction, said melted plug is allowed to cool.

* * * * *

UNITED STATES PATENT AND TRADEMARK OFFICE
CERTIFICATE OF CORRECTION

PATENT NO.         : 7,195,036 B2                              Page 1 of 1
APPLICATION NO.    : 10/696889
DATED              : March 27, 2007
INVENTOR(S)        : Mark A. Burns and Rohit Pal It is certified that error appears in the above-identified patent and that said Letters Patent is hereby corrected as shown below:

Column 1 Line 7:

Change: "The government may have certain rights in the invention."

To read: --The government has certain rights in the invention.--.

Signed and Sealed this

Twenty-fourth Day of March, 2009

JOHN DOLL
*Acting Director of the United States Patent and Trademark Office*